United States Patent
Richter et al.

(10) Patent No.: US 10,935,055 B2
(45) Date of Patent: Mar. 2, 2021

(54) ELECTROHYDRAULIC ACTUATOR

(71) Applicant: Kyntronics, Inc., Solon, OH (US)

(72) Inventors: Carl Richter, Chagrin Falls, OH (US);
Scott Huling, Chagrin Falls, OH (US);
William Nelson, Mentor, OH (US)

(73) Assignee: Kyntronics, Inc., Solon, OH (US)

( * ) Notice: Subject to any disclaimer, the term of this patent is extended or adjusted under 35 U.S.C. 154(b) by 0 days.

(21) Appl. No.: 16/330,192

(22) PCT Filed: Aug. 16, 2018

(86) PCT No.: PCT/US2018/000174
§ 371 (c)(1),
(2) Date: Mar. 4, 2019

(87) PCT Pub. No.: WO2019/035906
PCT Pub. Date: Feb. 21, 2019

(65) Prior Publication Data
US 2019/0226504 A1    Jul. 25, 2019

Related U.S. Application Data

(60) Provisional application No. 62/546,136, filed on Aug. 16, 2017, provisional application No. 62/633,784,
(Continued)

(51) Int. Cl.
*F15B 15/14* (2006.01)
*F16J 10/02* (2006.01)
(Continued)

(52) U.S. Cl.
CPC ............ *F15B 15/1428* (2013.01); *F15B 1/26* (2013.01); *F15B 11/10* (2013.01); *F15B 13/027* (2013.01);
(Continued)

(58) Field of Classification Search
CPC .. F15B 15/18; F15B 7/10; F15B 15/22; F15B 15/204; F15B 15/223; F16J 1/09
See application file for complete search history.

(56) References Cited

U.S. PATENT DOCUMENTS 1,736,188 A    11/1929  Daesen et al.
2,918,795 A  * 12/1959  Marien ................... B64C 13/24
                                                60/475
(Continued)

FOREIGN PATENT DOCUMENTS

CN    101074685    11/2007
DE    2757081      6/1979
(Continued)

OTHER PUBLICATIONS

Parker Oidyne Compact EHA brochure, Electro-Hydraulic Actuators, © 2007 Parker Hannifin Corporation, 4 pages.
(Continued)

*Primary Examiner* — Thomas E Lazo
(74) *Attorney, Agent, or Firm* — Fay Sharpe LLP

(57) ABSTRACT

A modular electrohydraulic actuator including an electric motor, a hydraulic pump driven by the electric motor, and a hydraulic actuator in fluid communication with the hydraulic pump. The hydraulic actuator includes a hydraulic cylinder supporting a pressure sleeve in which a piston and rod is adapted for reciprocating motion in response to a supply of pressurized fluid to a first side or a second side of the piston, wherein at least one of the electric motor, hydraulic pump, hydraulic cylinder, piston, piston rod or the pressure sleeve supported in the hydraulic cylinder is selectively removable and replaceable with a different component to vary at least one performance characteristic of the electrohydraulic actuator.

15 Claims, 19 Drawing Sheets

Related U.S. Application Data filed on Feb. 22, 2018, provisional application No. 62/647,995, filed on Mar. 26, 2018, provisional application No. 62/681,302, filed on Jun. 6, 2018.

(51) Int. Cl.

| | | |
|---|---|---|
| *F15B 15/08* | (2006.01) | |
| *F15B 1/26* | (2006.01) | |
| *F15B 11/10* | (2006.01) | |
| *F15B 13/02* | (2006.01) | |
| *F15B 13/042* | (2006.01) | |

(52) U.S. Cl.
CPC .......... *F15B 13/0426* (2013.01); *F15B 15/08* (2013.01); *F15B 15/14* (2013.01); *F15B 15/1433* (2013.01); *F15B 15/1461* (2013.01); *F16J 10/02* (2013.01); *F15B 2211/20515* (2013.01); *F15B 2211/30505* (2013.01); *F15B 2211/329* (2013.01); *F15B 2211/6336* (2013.01); *F15B 2211/7053* (2013.01)

(56) References Cited

U.S. PATENT DOCUMENTS

| | | | | |
|---|---|---|---|---|
| 2,945,353 | A | | 7/1960 | Glas |
| 3,388,634 | A | * | 6/1968 | Madland ............... F15B 15/223 91/26 |
| 3,476,014 | A | * | 11/1969 | Flock .................... F15B 15/222 91/394 |
| 3,637,187 | A | * | 1/1972 | Burger ................ F16K 31/1262 251/61.3 |
| 3,654,834 | A | * | 4/1972 | Sifri ..................... F15B 15/225 91/399 |
| 4,069,749 | A | | 1/1978 | Olsen et al. |
| 4,193,733 | A | * | 3/1980 | Ullmann ................. E02F 3/425 414/694 |
| 4,367,786 | A | * | 1/1983 | Hafner .................... F15B 1/086 138/30 |
| 4,458,717 | A | * | 7/1984 | Boland ................ F15B 15/223 137/496 |
| 4,651,781 | A | * | 3/1987 | Kandelman ............. F15B 1/086 138/26 |
| 4,825,752 | A | * | 5/1989 | Kiffmeyer ............ F15B 15/225 91/419 |
| 5,097,857 | A | | 3/1992 | Mayhew |
| 5,517,898 | A | * | 5/1996 | Kim ...................... F15B 15/225 91/24 |
| 5,519,995 | A | * | 5/1996 | Sasse ...................... F15B 15/18 60/476 |
| 6,523,452 | B2 | * | 2/2003 | Dougami .............. F15B 15/222 91/394 |
| 6,796,120 | B2 | * | 9/2004 | Franchet ................. F15B 7/006 60/413 |
| 7,152,932 | B2 | * | 12/2006 | Kuznicki ................. B60K 6/12 303/87 |
| 7,434,395 | B2 | * | 10/2008 | He .......................... F15B 15/18 60/475 |
| 8,444,400 | B2 | | 5/2013 | Khalil |
| 8,448,432 | B2 | * | 5/2013 | Bresie ..................... F15B 7/006 60/414 |
| 8,590,679 | B2 | * | 11/2013 | Hall ........................ F16F 9/187 188/297 |
| 8,841,786 | B2 | * | 9/2014 | Tucker ................. B60G 11/265 290/1 R |
| 9,234,532 | B2 | | 1/2016 | Vanderlaan et al. |
| 9,435,356 | B1 | * | 9/2016 | Mallick .................... F15B 1/24 |
| 9,855,814 | B2 | * | 1/2018 | Tucker ................... B60G 17/04 |
| 10,344,779 | B2 | | 7/2019 | Besch et al. |
| 10,471,798 | B2 | * | 11/2019 | Tucker ................... B60G 17/04 |
| 2004/0056395 | A1 | | 3/2004 | Thut |
| 2005/0120768 | A1 | | 6/2005 | McCarthy et al. |
| 2008/0264646 | A1 | * | 10/2008 | Sten-Halvorsen ...... E21B 34/04 166/360 |
| 2010/0300279 | A1 | * | 12/2010 | Kadlicko ................ F15B 15/18 91/361 |
| 2016/0102685 | A1 | | 4/2016 | Chester |

FOREIGN PATENT DOCUMENTS

| | | |
|---|---|---|
| DE | 3638739 A1 | 6/1988 |
| WO | WO96/15375 | 5/1996 |
| WO | WO98/11357 | 3/1998 |
| WO | WO2016/057750 | 4/2016 |
| WO | WO2017/009291 | 1/2017 |

OTHER PUBLICATIONS

International Search Report and Written Opinion, dated Oct. 10, 2018, in connection with PCT/US2018/000174, filed Aug. 16, 2018.
Article, *Hydraulics & Pneumatics*, "All-in-One Actuator is Showcase of Simplicity", Carl Richter, Oct. 2, 2017, pp. 1-16.

* cited by examiner

ALL ATTACHED

REMOTE DRIVE AND
MOTOR/MANIFOLD COMBINED

REMOTE DRIVE AND
MOTOR/MANIFOLD SEPARATED

REMOTE DRIVE

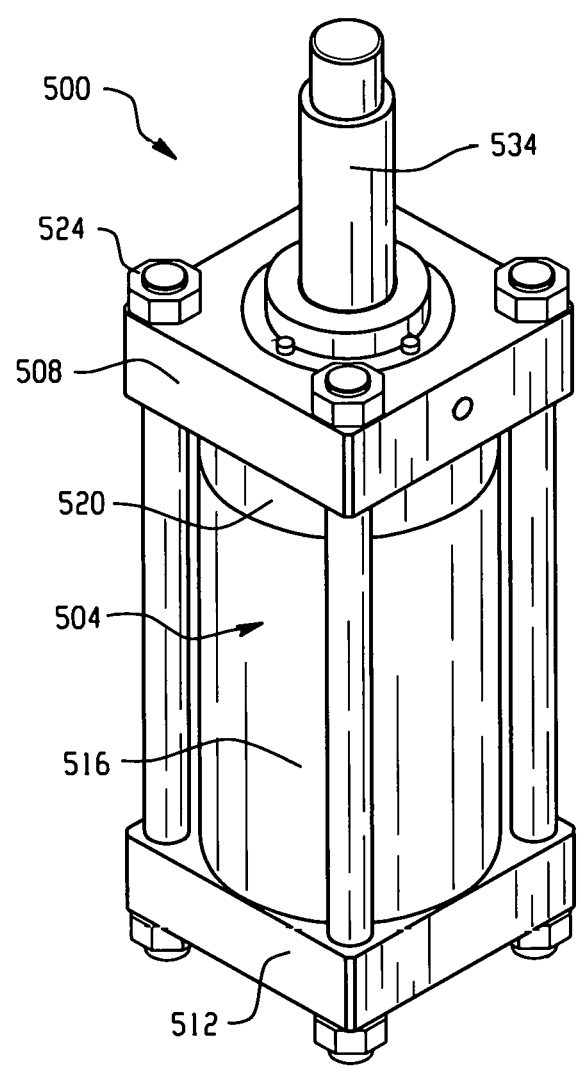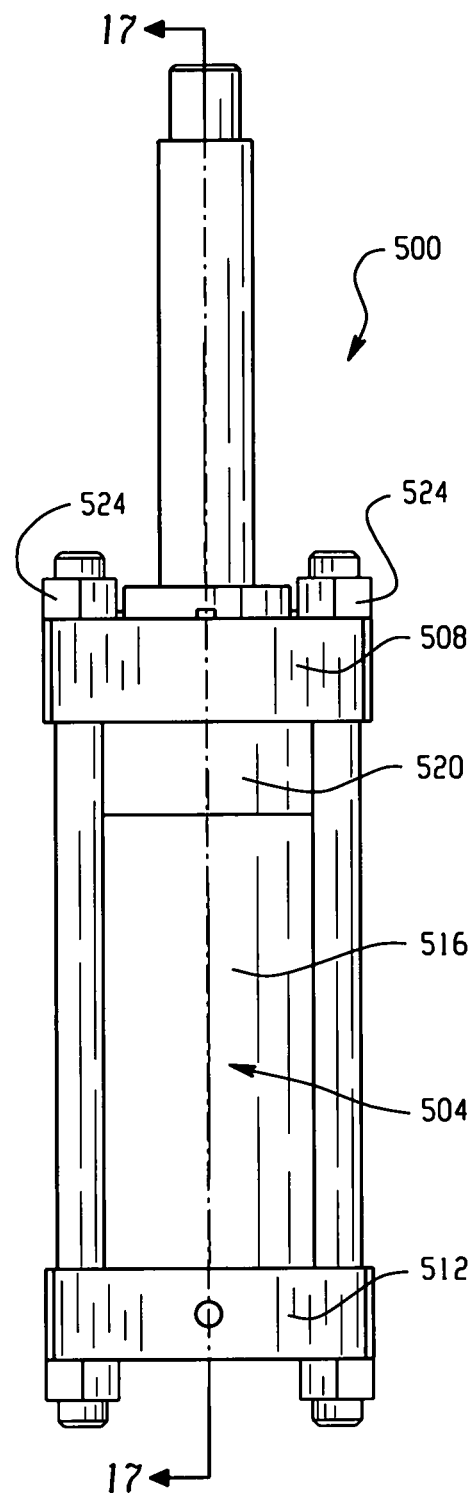
Fig. 14
Fig. 15

ELECTROHYDRAULIC ACTUATOR

CROSS-REFERENCE TO RELATED APPLICATIONS

This application claims priority to and the benefit of the filing date of International Application No. PCT/US2018/000174, filed Aug. 16, 2018, which application claims priority to and the benefit of the filing date of U.S. Provisional Patent Application Serial No. 62/546,136, filed Aug. 16, 2017; U.S. Provisional Patent Application Ser. No. 62/633,784, filed Feb. 22, 2018; U.S. Provisional Patent Application Ser. No. 62/647,995, filed Mar. 26, 2018; and, U.S. Provisional Patent Application Ser. No. 62/681,302, filed Jun. 6, 2018, which applications are hereby incorporated by reference.

FIELD

The present disclosure relates to electrohydraulic actuators. It finds particularly use in connection with electrohydraulic actuators for use in connection with actuation systems, but other applications are also contemplated.

BACKGROUND

An electrohydraulic actuator, hereinafter referred to as an EHA, generally includes a hydraulic actuator coupled to, or otherwise configured to, drive or move an associated component. In some applications, the hydraulic actuator can be a hydraulic piston/cylinder, for example. Extension and retraction of the piston within the cylinder is effected by pressurized hydraulic fluid that is supplied to the cylinder on one or the other of two sides of the piston. An electric motor driving a hydraulic pump is used for supplying the pressurized hydraulic fluid to the cylinder.

The speed and direction of movement of the piston between the extended and retracted positions in many applications is based on the direction of rotation and the speed of the electric motor driving the hydraulic pump. As such, the control signals delivered to the electric motor are essentially responsible for controlling the direction of movement and speed of the piston. Typically, the control signals are delivered via a control unit, and the position of the piston is determined via a suitable sensor (e.g., position feedback device) that provides feedback to the control unit allowing precise movement of the piston.

Early EHAs were developed for general use in aviation for controlling the positions of the flight control surfaces of an aircraft. EHAs are particularly well-suited to this application because of their self-contained nature, and because at a minimum, a simple two-wire power/communications connection is all that is required to render an EHA operational thus eliminating the need to provide redundant hydraulic lines, as is typical with conventional flight control surface actuators.

Outside of aviation, EHAs have found wide application in a variety of different industries. In general, EHAs must be customized for a specific application. Customization generally includes selecting a suitable hydraulic cylinder based on stroke length and force requirements of the application, and coupling the selected hydraulic cylinder to a suitable electric motor/hydraulic pump combination. These components are then typically packaged, along with a control unit, into a common, self-contained EHA assembly. As such, existing EHA's generally require long lead times to configure, test and deliver the custom unit to a customer.

BRIEF DESCRIPTION

In the past, development of EHAs has focused on making self-contained EHAs smaller and more powerful. The present disclosure sets forth a modular EHA assembly and method that includes a hydraulic cylinder having a housing configured to accommodate a plurality of different piston/cylinder combinations (e.g., different diameter pistons/cylinders and piston rods) and/or lengths such that a desired piston/cylinder combination can be selected and installed into the assembly without the need to completely replace or reengineer the hydraulic cylinder or entire EHA.

In addition to the modularity of the exemplary EHA assembly, the hydraulic cylinder of the present disclosure is configured with an interior reservoir for rod volume compensation. In one embodiment, the interior reservoir is an annular space within the hydraulic cylinder that surrounds an inner pressure sleeve of the hydraulic cylinder in which the piston is supported for movement. The annular chamber is at least partially filled with a closed-cell foam material that is configured to compress to accommodate excess hydraulic fluid during piston rod retraction. When compressed, the closed-cell foam applies a restoring pressure to the hydraulic fluid to urge the hydraulic fluid out of the annular reservoir during rod extension. The arrangement of the annular reservoir along the length of the inner cylinder is advantageous in that the volume of the annular reservoir is a function of the length of the inner cylinder, whereby a longer inner cylinder (and, thus, longer piston rod) results in a larger capacity reservoir as compared to a shorter cylinder (and, thus, shorter piston rod). As such, the design automatically adjusts to accommodate excess rod volume based on the length of the inner cylinder.

Aspects of the present disclosure are further directed to an EHA that utilizes piloted check valves in a closed-loop hydraulic circuit to mimic systems using much more expensive and complex counterbalance valves. In addition, a linear potentiometer is mounted to the hydraulic cylinder for providing feedback of the position of the piston. The length of the linear potentiometer can be tailored to correspond to a particular hydraulic cylinder size/length.

An exemplary EHA in accordance with the present disclosure is highly configurable to wide variety of applications without a change in form factor.

In accordance with another aspect, an exemplary EHA includes at least one high speed/low force cylinder and a low speed/high force cylinder. The high speed/low force cylinder allows rapid movement of the EHA between a retracted position and an extended position when under a relatively low load. The low speed/high force cylinder allows extension/retraction of the EHA under relatively high loads. In general, only one of the cylinders will be actuated at a given time, with the other cylinder being placed in a float mode and dumping fluid to reservoir for future use. A position feedback device (e.g., linear potentiometer) can provide position feedback information to a controller for determining when to activate/deactivate the respective cylinders based upon the position of an EHA rod and/or position of the cylinder rods. Pressure sensors can also be used to perform closed loop force control on the low speed/high force cylinder.

In accordance with another aspect, a modular electrohydraulic actuator comprises an electric motor, a hydraulic pump driven by the electric motor, and a hydraulic actuator in fluid communication with the hydraulic pump. The hydraulic actuator includes a hydraulic cylinder supporting a pressure sleeve in which a piston and rod is adapted for reciprocating motion in response to a supply of pressurized fluid to a first side or a second side of the piston, wherein at least one of the electric motor, hydraulic pump, hydraulic cylinder, piston, piston rod or the pressure sleeve supported in the hydraulic cylinder is selectively removable and replaceable with a different component to vary at least one performance characteristic of the electrohydraulic actuator.

The hydraulic cylinder can include a tubular housing in which the pressure sleeve is supported, first and second end caps enclosing the pressure sleeve in the tubular housing and a reservoir extending between the tubular housing and the pressure sleeve. At least one of the end caps can be removably attached to the tubular housing, and the cylinder can further include a rod seal cartridge configured to be interchanged to accommodate different diameter rod sizes. The pressure sleeve can be interchangeable such that a plurality of different diameter pressure sleeves and pistons can be supported within the tubular housing to achieve desired performance without changing other aspects of the electrohydraulic actuator, unless desired. In one embodiment, the cylinder further includes compressible foam at least partially occupying a portion of the reservoir, the compressible foam operative to compress to accommodate hydraulic fluid and to expand to expel hydraulic fluid depending on a pressure of the hydraulic fluid within the reservoir. The foam can include, for example, a closed-cell Epichlorohydrin (ECH) foam. The pump and the actuator can be fluidly connected by first and second lines and a first pilot-operated check valve for restricting or permitting flow through the first line based at least in part on a pressure in the second line can be provides, and a second pilot-operated check valve for restricting or permitting flow through the second line based at least in part on a pressure in the first line can be provided. The pump can be configured to supply fluid via either the first or second lines to the actuator with a pressure sufficient for the pilot-operated check valve of the other line to permit flow therethrough. The electrohydraulic actuator can further include a drive controller, wherein at least one of the electric motor, hydraulic pump driven by the electric motor, hydraulic actuator or driver controller are separately mountable in spaced relation to the other components. A position feedback device can be included for providing position feedback information to a controller.

In accordance with another aspect, a modular hydraulic cylinder comprises a tubular housing, a pressure sleeve supported within the tubular housing, a piston and rod at least partially supported in the pressure sleeve for reciprocating motion, first and second end caps enclosing the pressure sleeve in the tubular housing, and a hydraulic fluid reservoir extending between the tubular housing and the pressure sleeve. At least one of the pressure sleeve, piston or piston rod can be removed from the tubular housing and replaced with a respective component having a different size to change an operating characteristic of the hydraulic cylinder. At least one of the end caps can be removably attached to the tubular housing, and a rod seal cartridge can be supported by one of the end caps and configured to be interchanged to accommodate different diameter rod sizes. At least one threaded fastener can be used for securing the at least one end cap the tubular housing. Compressible foam can at least partially occupy a portion of the reservoir, the compressible foam operative to compress to accommodate hydraulic fluid in the reservoir and to expand to expel hydraulic fluid from the reservoir depending on a pressure of the hydraulic fluid within the reservoir. The foam can include a closed-cell Epichlorohydrin (ECH) foam.

In accordance with another aspect, a double bore hydraulic cylinder comprises a body including a first bore having a first diameter and a second bore having a second diameter, the first bore and the second bore forming a chamber of the cylinder, and a piston supported for axial movement within the chamber of the cylinder and having a first portion configured to seal within the first bore during a first part of its stroke, and permit fluid to bypass the piston within the chamber during a second part of its stroke.

The first bore can have a diameter that is less than a diameter of the second bore, and the piston can further include a second portion axially spaced from the first portion and having a diameter adapted to be closely received in the second bore. The second portion of the piston can have at least one passageway for permitting the flow of fluid therethrough. The second portion of the piston can be cylindrical, and the at least one passageway can extend in parallel to a central axis of the second portion of the piston. The second portion of the piston can include a plurality of passageways arranged circumferentially about the central axis of the second portion of the piston. In one embodiment, when the first portion of the piston is within the second bore, an outer circumferential surface of the first portion of the piston is spaced from the body defining an annular passageway for the flow of fluid from a first side of the piston to a second side of the piston via the plurality of passageways in the second portion of the piston.

BRIEF DESCRIPTION OF THE DRAWINGS

FIG. 14 is a perspective view of a double bore cylinder assembly in accordance with the present disclosure;

FIG. 15 is a side elevation view of the double bore cylinder of FIG. 14;

DETAILED DESCRIPTION

Figure 1:
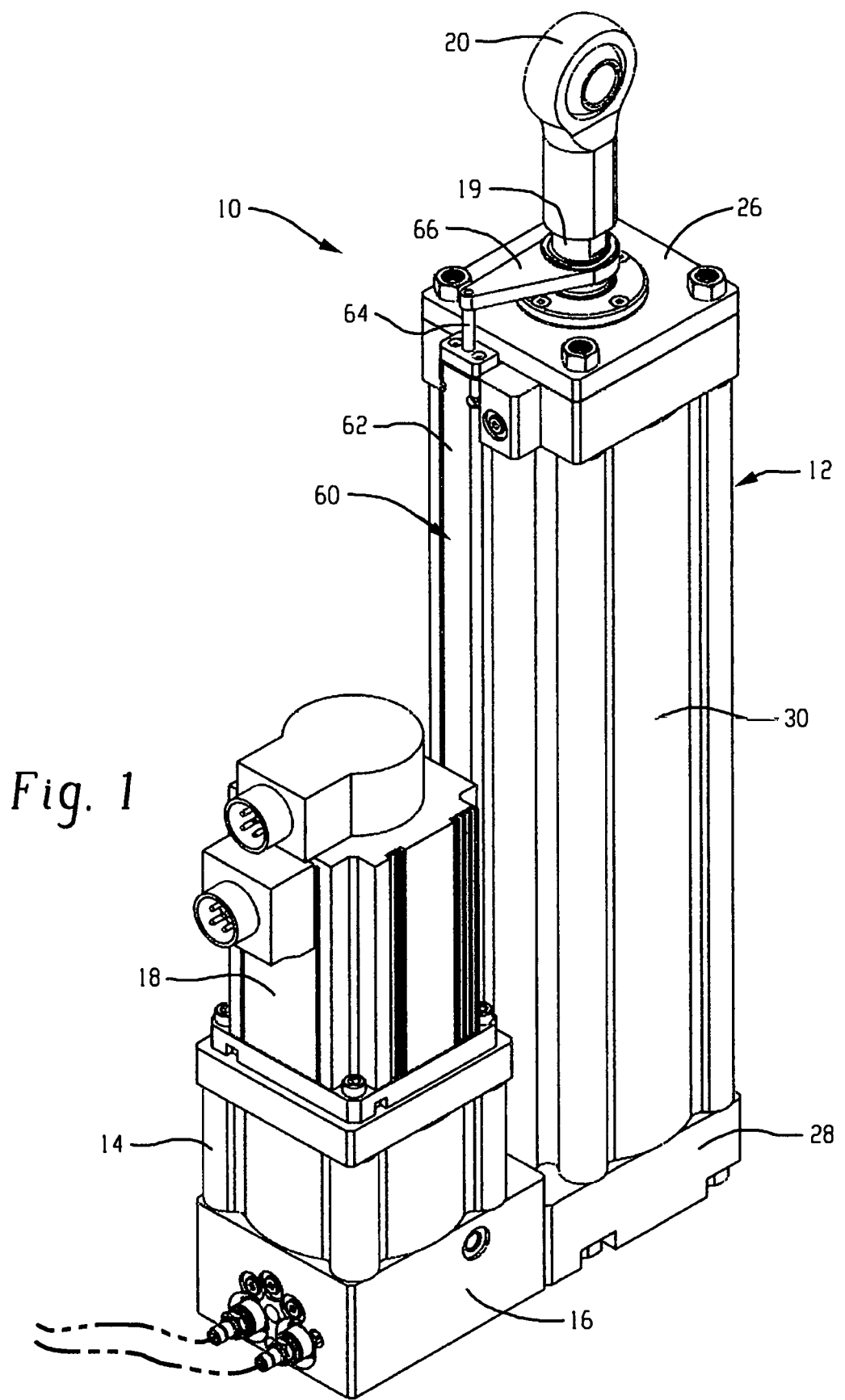
FIG. 1 is a perspective view of an exemplary EHA system and related components in accordance with the present disclosure.

In FIG. 1, an exemplary EHA in accordance with the present disclosure is illustrated and identified generally by reference numeral 10. The EHA 10 generally includes a hydraulic cylinder 12 fluidly coupled to a reversible hydraulic pump 14 via a manifold 16. An electric motor 18 is mechanically coupled to the hydraulic pump 14 for driving the pump clockwise or counterclockwise. Rotation of the pump 14 in one or the other direction supplies pressurized fluid to the hydraulic cylinder 12 for extension and retraction of a piston rod 19. As will be appreciated, the piston rod 19 can be attached to an associated component via any suitable connection, such as a rod swivel eye 20 as illustrated. The exemplary hydraulic circuit defined by the hydraulic cylinder 12, hydraulic pump 14, manifold 16 and associated valving (described in detail below) is a closed-loop hydraulic circuit. However, certain aspects of the present disclosure are amenable to open-loop hydraulic systems as well.

As noted above, the EHA 10 is modular and highly configurable to allow customization of various performance aspects of the EHA 10. To this end, and with further reference to FIGS. 2 and 3, an upper portion of two hydraulic cylinders 12' and 12" are shown in cross-section. It should be appreciated that the components of each of the hydraulic cylinders 12'/12" are essentially the same except for the sizes of the respective piston rod and/or piston/cylinder. Further, each hydraulic cylinder 12'/12" is likewise identical to the hydraulic cylinder 12 illustrated in FIG. 1. Accordingly, the details of hydraulic cylinders 12'/12"will be described together. In the following description, the same reference numerals denote the same components in each figure with a single prime denoting a component appearing in FIG. 2 and a double prime denoting a component appearing in FIG. 3.

The hydraulic cylinders 12' and 12" each include a housing 21'/21" in which an inner pressure sleeve 22'/22", a piston (not shown) and a piston rod 24'/24" are supported. The housing 21'/21" includes a first (upper) end cap 26'/26" and second (lower) end cap (not shown in FIGS. 2 and 3, but substantially similar to end cap 28 in FIG. 1) secured to opposite ends of a tubular main body 30'/30". Bolts 32'/32", or other fasteners, removably secure the end caps to the main body 30'/30" containing the pressure sleeve therein.

Figure 2:
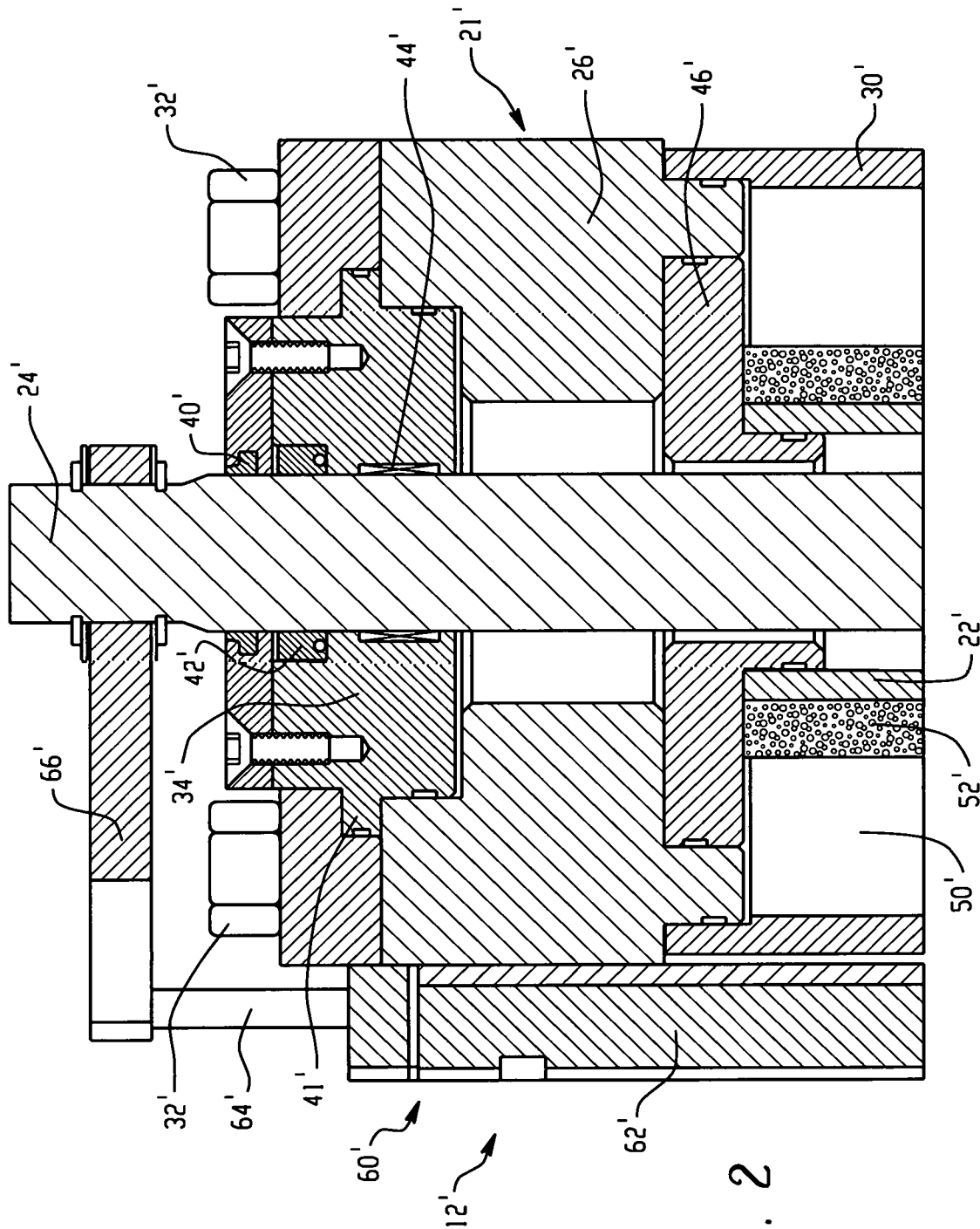
FIG. 2 is a cross-sectional view of an upper portion of a first hydraulic cylinder that can be used in conjunction with the EHA system of FIG. 1 in accordance with the present disclosure.
Figure 3:
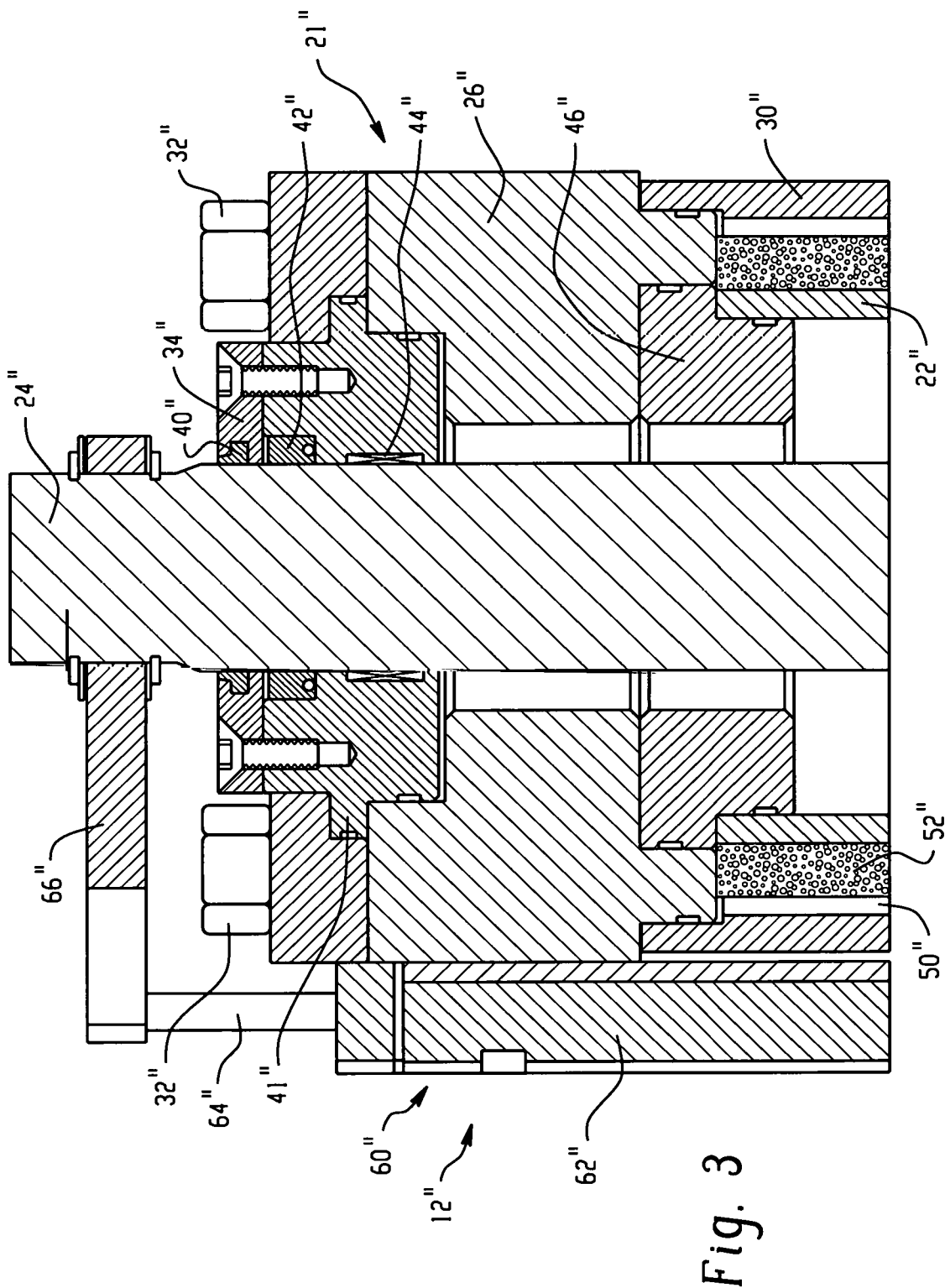
FIG. 3 is a cross-sectional view of an upper portion of a second hydraulic cylinder that can be used in conjunction with the EHA system of FIG. 1 in accordance with the present disclosure.

It should be appreciated that the end cap 26'/26" can be removed from the tubular main body 30'/30" to facilitate swapping a different size (e.g., diameter and/or length) inner pressure sleeve/piston/piston rod combination into the housing 21'/21". For example, FIGS. 2 and 3 illustrate two different pressure sleeve and piston rod size combinations supported in the housing 21'/21". As will also be appreciated, performance of the EHA 10 in terms of force generated, speed of movement of the piston, stroke, suitability for a particular application, etc. can be tailored by selecting a specific combination of inner pressure sleeve, pistons and rod diameters.

To facilitate swapping of different diameter pressure sleeve and piston/piston rods into the housing 21'/21", a plurality of rod seal cartridge assemblies 34'/34", each having different piston rod bore diameter, are adapted to be interchangeably supported by the end cap 26'/26" for supporting a piston/piston rod of a particular diameter. The rod seal cartridge 34'/34" includes a shoulder 41'/41" that is trapped in a groove formed between portions of the end cap 26'/26". As shown in FIG. 2, a rod seal cartridge assembly 34' having a 0.75 inch rod bore is supported by the end cap 26', with a corresponding 0.75" piston rod 24' supported therein. As shown in FIG. 3, a rod seal cartridge assembly 34" having a 1" rod bore is supported by the end cap 26", with a corresponding 1" piston rod 24" supported therein. Of course, a wide range of other rod diameters can be provided in accordance with the present disclosure.

The rod seal cartridge 34'/34" supports a wiper seal 40'/40" and a main piston rod seal 42'/42". A bearing 44'/44" supports the piston rod 24'/24" for axial sliding movement. An interchangeable insert 46'/46" having a selected bore size is configured to mate with an axial end of the pressure sleeve 22'/22" to further support the piston rod 24'/24".

Although not visible in FIGS. 2 and 3, the hydraulic cylinder has a piston having a diameter corresponding to the diameter of the pressure sleeve 22'/22". As such, it will be appreciated that replacement of the pressure sleeve 22'/22" and piston is possible to achieve a hydraulic cylinder having a piston of a desired surface area. In FIG. 2 the pressure sleeve 22' has a smaller diameter than the pressure sleeve 22" of FIG. 3. Accordingly, the piston of the hydraulic cylinder of FIG. 2 has a smaller diameter than the piston of the hydraulic cylinder of FIG. 3.

It should further be understood that a longer or shorter hydraulic cylinder can be configured by swapping tubular main body 30'/30" for a tubular main body of a desired length, and changing out the piston/piston rod as appropriate.

As noted above, the exemplary embodiment is a closed-loop hydraulic system. As such, the difference in the volume of hydraulic fluid on each side of the piston due to the volume of the piston rod 24'/24" within the pressure sleeve 22'/22" must be accommodated to facilitate complete extension/retraction cycling of the piston within the pressure sleeve. That is, upon retraction of the piston rod 24'/24" a larger volume of fluid is expelled from the cylinder than during extension of the piston rod 24'/24".

The hydraulic cylinder 12'/12" further includes a rod volume compensating component in the form of a reservoir 50'/50" at least partially filled with a compressible member, which in the illustrated embodiment includes a closed-cell compressible foam element 52'/52". The foam 52'/52" at least partially fills the annular reservoir 50'/50" and is configured to at least partially compress to accommodate excess hydraulic fluid under certain conditions. In this manner, the volume of the annular reservoir occupied by the foam decreases as the pressure of the hydraulic fluid increases. Various types of foam are suitable for this application, such as closed cell Epichlorohydrin (ECH) foam and/or certain silicone sponge materials.

Figure 4:
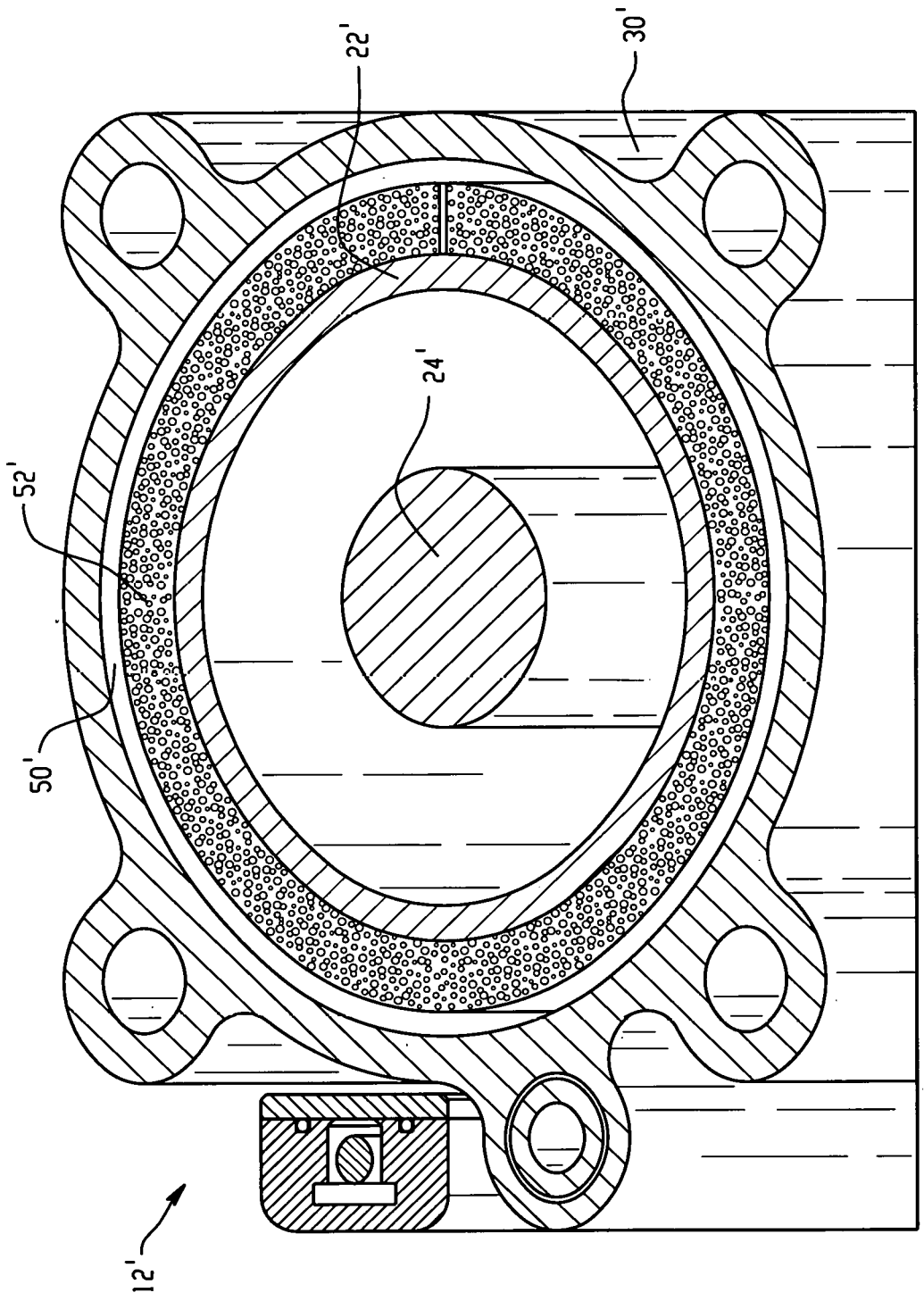
FIG. 4 is cross-sectional view of an exemplary hydraulic cylinder including an internal reservoir in accordance with the present disclosure.

As best seen in FIG. 4, which illustrates hydraulic cylinder 12' with end cap 26' removed, reservoir 50' is generally an annular space between the tubular main body 30' and the pressure sleeve 22'. In some embodiments, the reservoir 50' is concentric with the pressure sleeve 22' and coextensive therewith. In other embodiments, the reservoir 50' can be shorter or longer than the pressure sleeve 22'. It should be appreciated that hydraulic cylinder 12" of FIG. 3 has a similar configuration.

One particular advantage of the configuration of the annular reservoir 50'/50" is that it can be "self-adjusting" in that the volume of the reservoir 50'/50" is dependent on both the length and the diameter of the pressure sleeve 22'/22", all else being equal. As such, for applications wherein a longer pressure sleeve is installed, the resulting reservoir has a larger capacity to accommodate the resulting larger piston rod volume. This allows a wide range of stroke lengths to be provided while maintaining the system's consistent appearance.

During operation of the hydraulic cylinder, and particularly during retraction of the piston rod 24'/24", hydraulic fluid is forced into the reservoir 50'/50" causing the foam element 52'/52" to compress. As the foam element 52'/52" is compressed it applies a reactive force to the fluid within the reservoir 50'/50". This reactive force assists in urging the hydraulic fluid out of the reservoir 50'/50" upon extension of the piston rod 24'/24".

Figure 5:
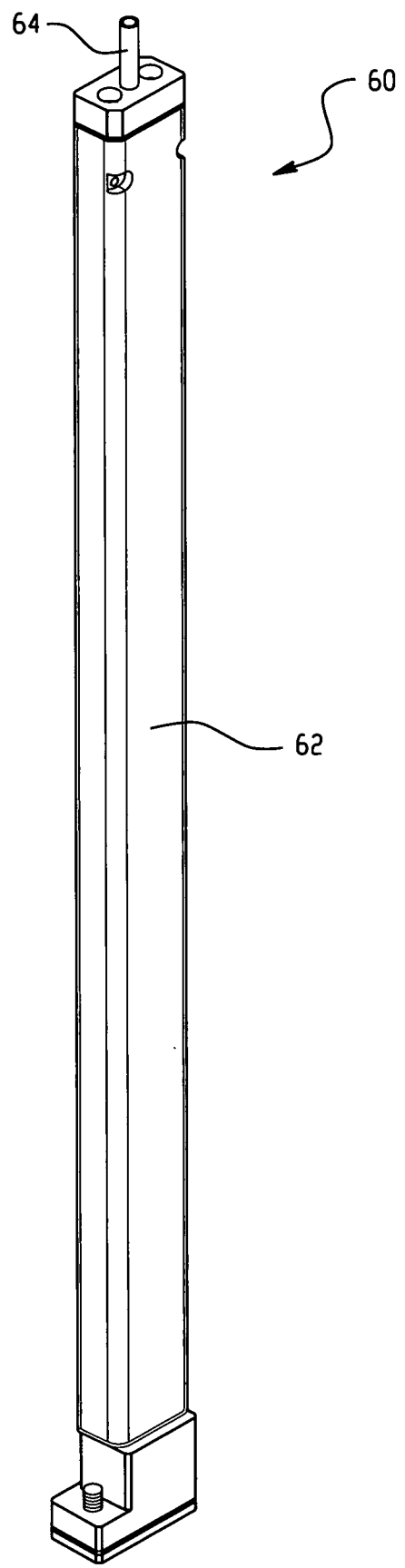
FIG. 5 is a perspective view of an exemplary linear potentiometer in accordance with the present disclosure.
Figure 6:
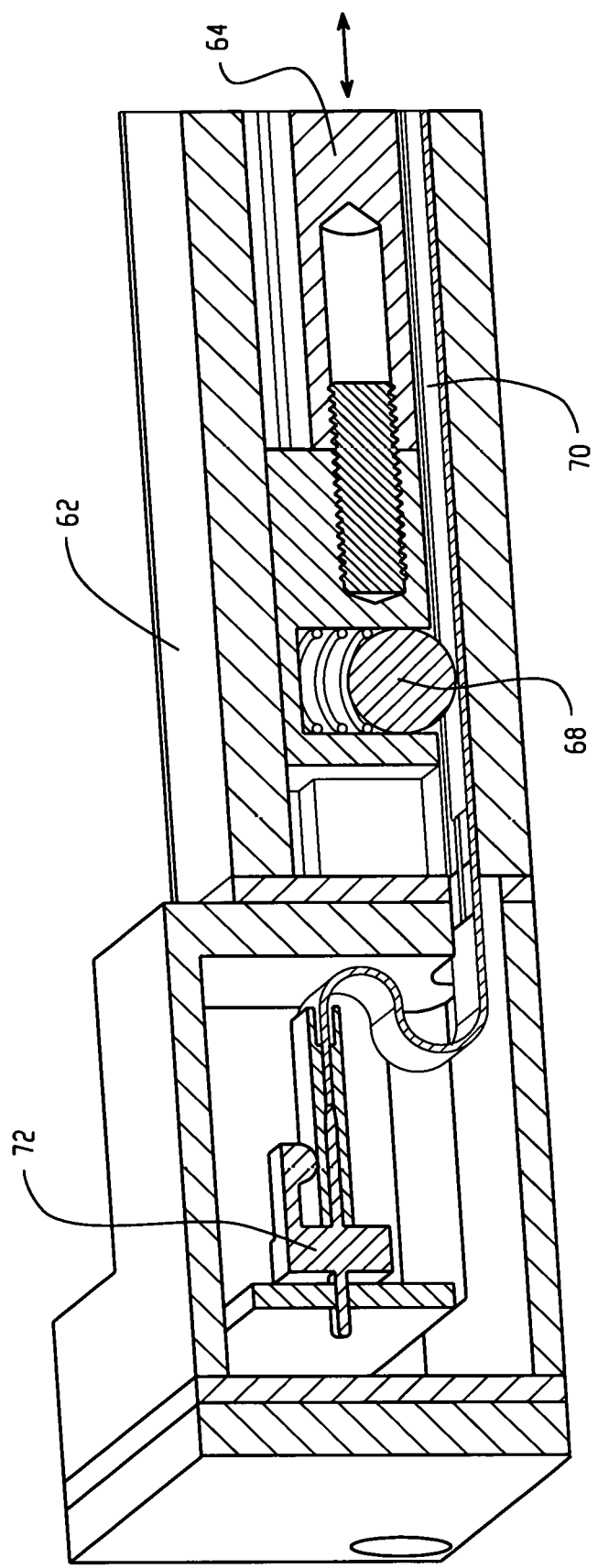
FIG. 6 is a cross-sectional view of a portion of the linear potentiometer of FIG. 5.

Returning to FIG. 1, and with further reference to FIGS. 5 and 6, a linear potentiometer 60 (60' in FIG. 2, 60" in FIG. 3) is mounted to the hydraulic cylinder 12 and is configured to provide feedback of the position of the piston rod 19 to a control unit (not shown). In FIG. 6, the linear potentiometer 60 generally includes a potentiometer housing 62 (62' in FIG. 2, 62" in FIG. 3) in which feedback rod 64 (64' in FIG. 2, 64" in FIG. 3) is supported for axial movement. The feedback rod 64 is coupled to the piston 19 for movement therewith by a feedback bracket 66 (66' in FIG. 2, 66" in FIG. 3). Accordingly, movement of the piston rod 19 results in a corresponding movement of the feedback rod 64. The feedback bracket can be coupled to the piston 19 via snap rings or the like, and may be configured to float (rotationally) slightly relative to the piston rod 19. The snap rings are designed to ensure a solid relationship (linearly) between the position rod and the piston rod providing accurate position readings.

As shown in FIG. 6, the feedback rod 64 has a spring loaded ball 68 fixed thereto for applying pressure to a linear potentiometer element 70. The position of the spring loaded ball 68 can be interpreted by circuitry 72 to determine a precise position of the feedback rod 64 and, thus, the piston rod 19.

This signal representing the actual rod position is sent to the control unit. The control unit compares the desired position of the rod commanded by the user to the actual rod position. The difference between the two positions results in an error signal generated by the control unit. The control unit uses the error signal to command the motor rotation, and thus the pump rotation, to move the rod closer to the desired position. Whether the position error is lagging or leading the desired position allows the control unit to determine the needed rotation direction for the motor/pump combination.

Figure 7A:
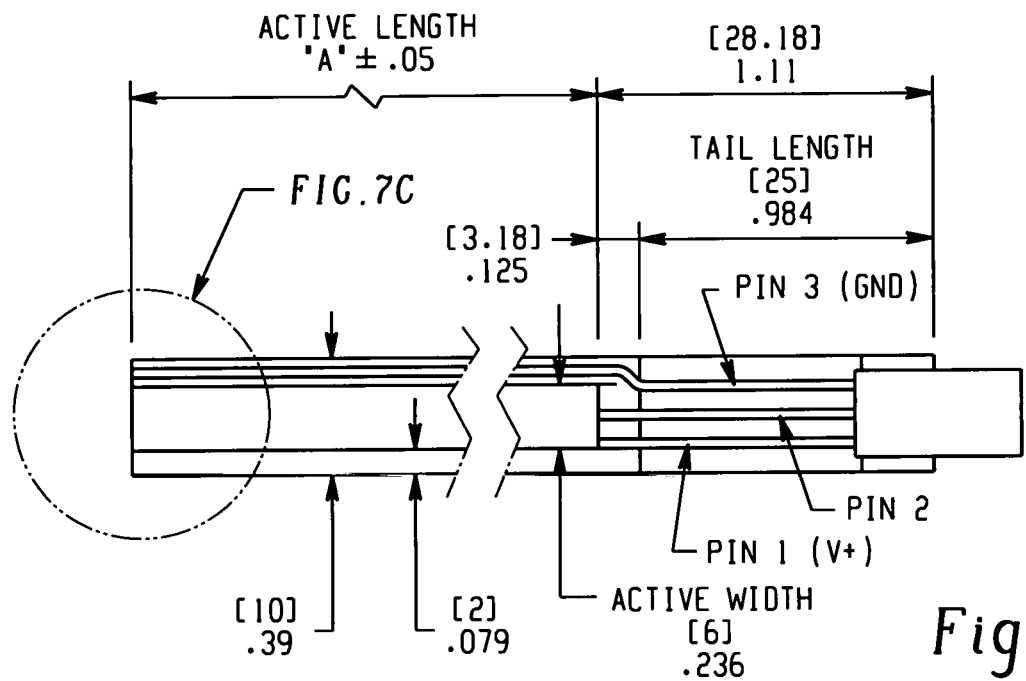
FIG. 7A is plan view of a thin potentiometer strip cut to a desired length in accordance with the present disclosure.
Figure 7B:
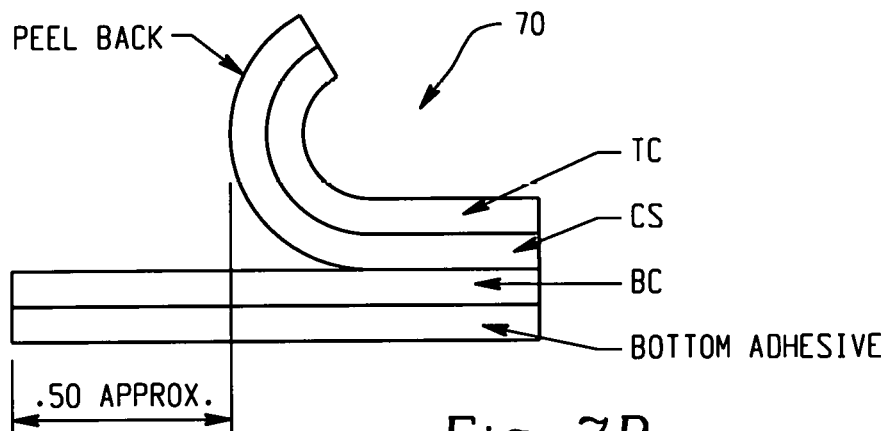
FIG. 7B is a side elevational view of the top circuit and circuit spacer peeled back from the bottom circuit of the thin potentiometer strip of FIG. 7A.
Figure 7C:
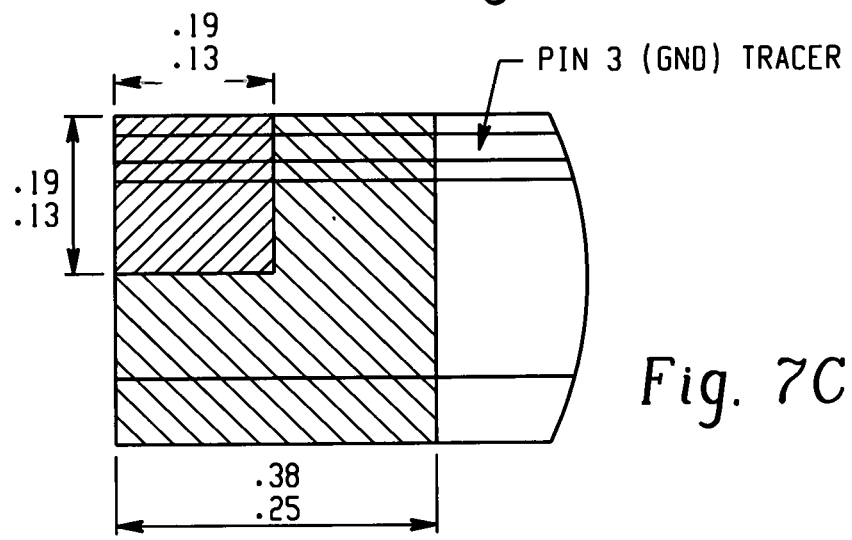
FIG. 7C is an enlarged portion of FIG. 7A.

FIGS. 7A-7C set forth details of an exemplary system and method for cutting the linear potentiometer element 70 to a desired length providing the modularity of a flexible design to adapt to the various cylinder stroke lengths reducing lead times. By applying an electric potential across the element of the linear potentiometer, an electric signal directly correlating to the actual rod position is produced.

The exemplary linear potentiometer element 70 generally comprises a top circuit TC and a bottom circuit BC separated by a circuit spacer CS. The bottom circuit is the resistive circuit and a voltage is applied thereto between pin 1 and pin 3, while the top circuit is the collector and is coupled to pin 2. The spring-loaded ball 68 is adapted to press against the top circuit TC such that it contacts the bottom circuit to generate a signal indicative of the position of the spring-loaded ball 68 and, by extension, the piston rod 19.

In accordance with the present disclosure, the linear potentiometer element 70 can be cut to any desired length. When cut, the bottom circuit is severed creating an open circuit between pin 1 and pin 3. Thus, after cutting to length, the top circuit and circuit spacer can be peeled back to allow acrylic adhesive to be applied to reconnect pin 1 to pin 3 to restore continuity to the bottom circuit BC. After a period of time, such as one minute, the continuity across pin 1 and pin 3 can be tested. If good, then two layers of high performance adhesive transfer tape is then applied to the bottom circuit BC. Then the top circuit TC and circuit spacer CS are replaced. A final test can be performed to confirm linear potentiometer 70 is operating correctly.

Figure 8A:
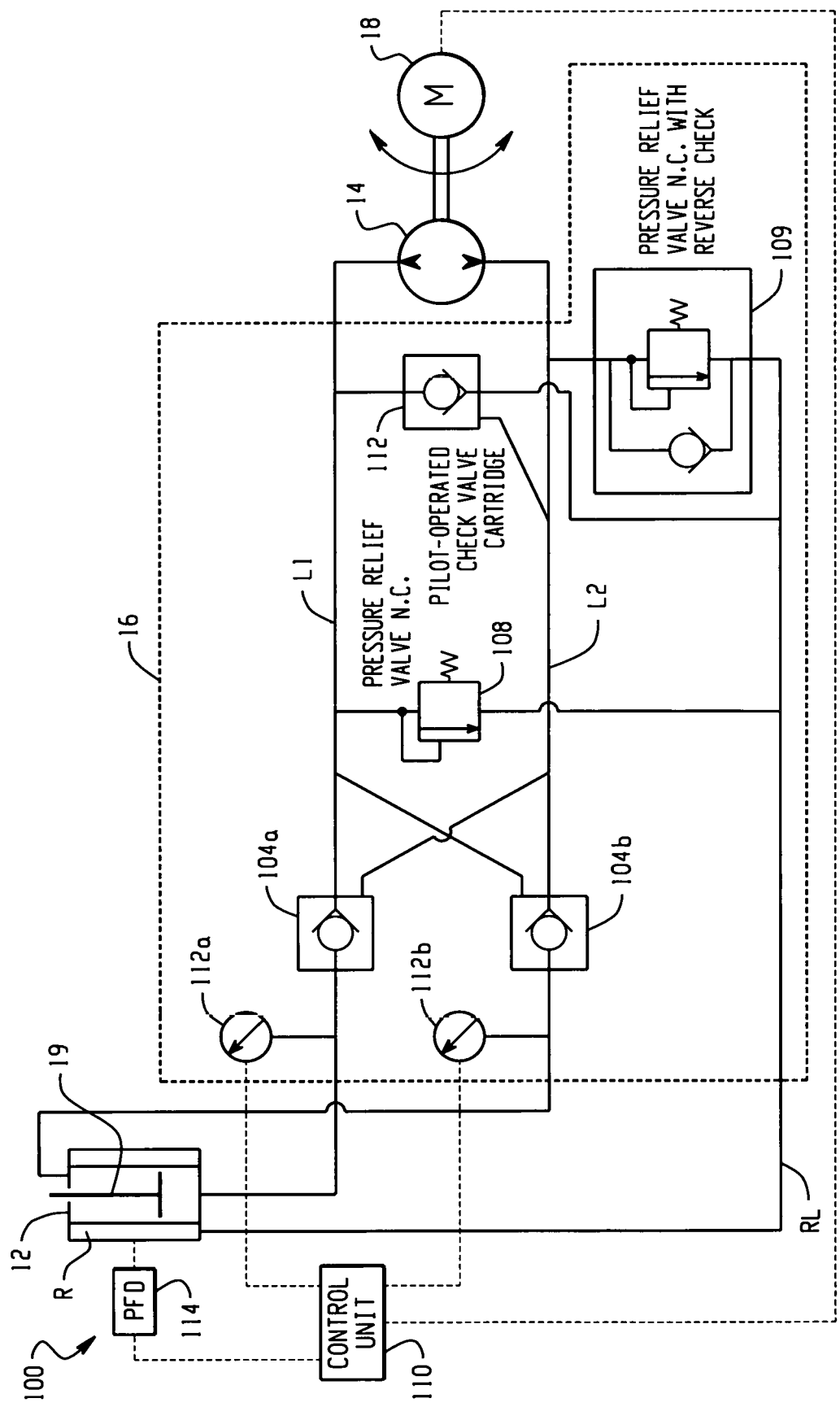
FIG. 8A is a schematic diagram of the hydraulic circuit of the exemplary EHA of FIG. 1.

Turning now to FIG. 8A, a schematic diagram of the hydraulic circuit of the exemplary EHA 10 of FIG. 1 is illustrated and identified generally by reference numeral 100. As noted above, the hydraulic circuit 100 generally comprises the hydraulic cylinder 12, hydraulic pump 14, and manifold 16 with associated valving which will now be described in detail. As shown, a pair of pilot operated check valves 104a and 104b are installed in respective supply/return lines L1 and L2 connecting the cylinder 12 and the pump 14. Each pilot operated check valve 104a and 104b is configured to permit or restrict flow through its respective line, when acting as part of a return line, based at least in part on the pressure in the supply line.

For example, when the motor 18 drives the pump 14 to supply pressurized fluid to line L1, the pilot line of check valve 104b senses the pressure in line L1 and opens check valve 104b when sufficient pressure is present so as to allow hydraulic fluid to flow from the piston rod side of the cylinder 12 thus extending the piston rod 19. In contrast, when the motor 18 drives the pump 14 to supply pressurized fluid to line L2, the pilot line of check valve 104a senses the pressure in line L2 and opens check valve 104a when sufficient pressure is present so as to allow hydraulic fluid to flow from the non-piston rod side of the cylinder 12 thus retracting the piston rod 19.

A reservoir R of the hydraulic cylinder 12 is connected via reservoir line RL to supply/return lines L1 and L2 by a normally closed pressure relief valve 108 which opens to the reservoir when the pressure in line L1 exceeds a threshold value, a normally closed pressure relief valve with reverse check valve 109 that opens to dump fluid to the reservoir R when pressure in line L2 exceeds a threshold value, and a pilot-operated check valve 109 that senses pressure in line L2 and opens to provide makeup flow to line L1 when the pressure in L2 exceeds a threshold value, such as during retraction of the piston rod.

Also shown in FIG. 8A is a control unit 110 adapted to supply control signals to the motor 18 and to receive input signals from pressure sensors 112a and 112b associated with supply/return line L1 and L2, respectively. A position feedback device 114 also supplies position feedback to the control unit 110.

Figure 8B:
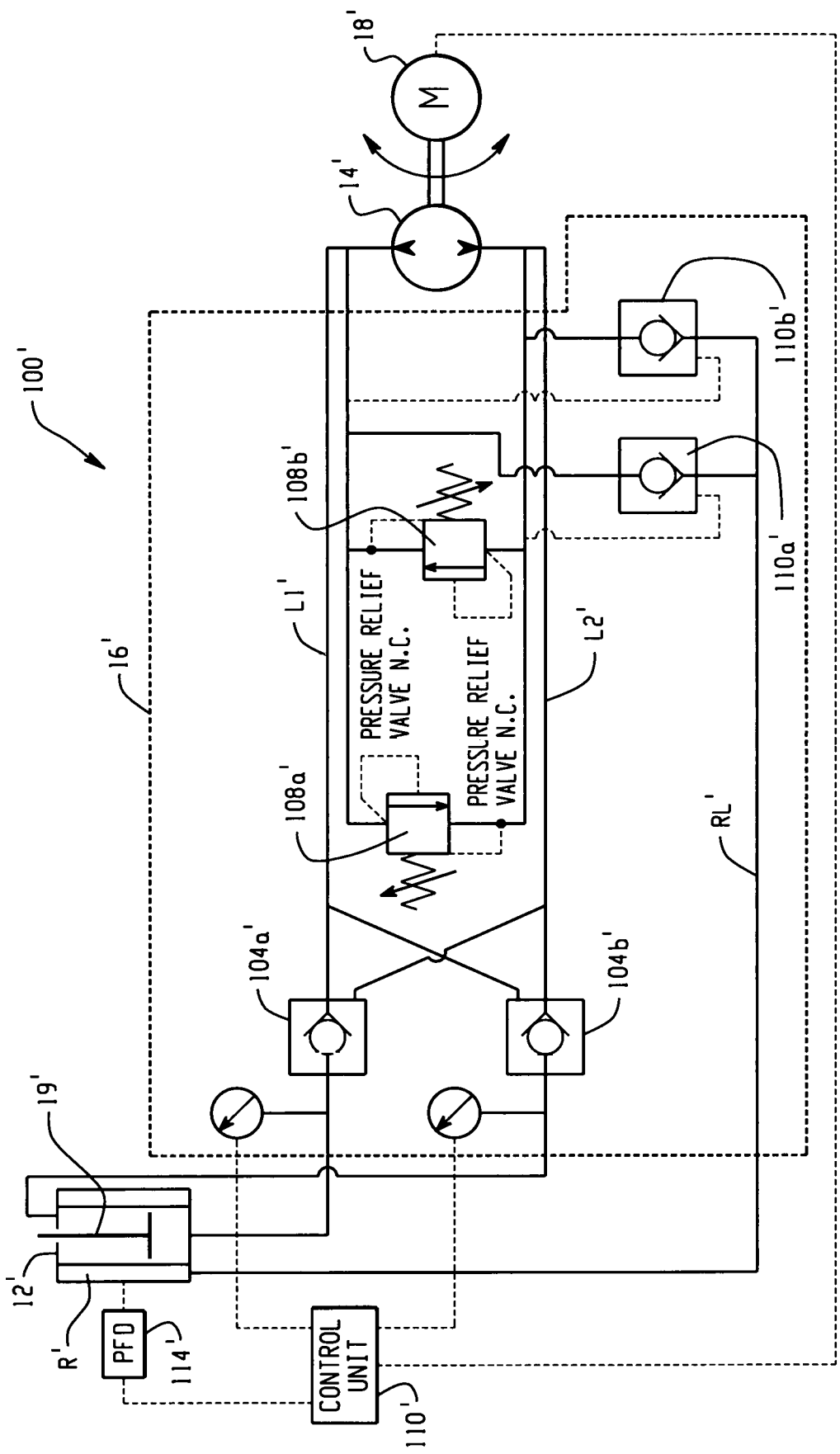
FIG. 8B is a schematic diagram of another hydraulic circuit of the exemplary EHA of FIG. 1.

FIG. 8B illustrates a schematic diagram of an alternative hydraulic circuit of the EHA 10 of FIG. 1 is illustrated and identified generally by reference numeral 100'. As noted above, the hydraulic circuit 100' generally comprises the hydraulic cylinder 12', hydraulic pump 14', and manifold 16' with associated valving which will now be described in detail. As shown, a pair of pilot operated check valves 104a' and 104b' are installed in respective supply/return lines L1' and L2' connecting the cylinder 12' and the pump 14'. Each pilot operated check valve 104a' and 104b' is configured to permit or restrict flow through its respective line, when acting as part of a return line, based at least in part on the pressure in the supply line. A bypass circuit includes first and second normally-closed pressure relief valves 108a' and 108b' for bypassing flow to a respective side of the pump 14' to prevent damage in the case of a locked actuator.

For example, when the motor 18' drives the pump 14' to supply pressurized fluid to line L1, the pilot line of check valve 104b' senses the pressure in line L1' and opens check valve 104b' when sufficient pressure is present so as to allow hydraulic fluid to flow from the piston rod side of the cylinder 12' thus extending the piston rod 19'. In contrast, when the motor 18' drives the pump 14' to supply pressurized fluid to line L2', the pilot line of check valve 104a' senses the pressure in line L2' and opens check valve 104a' when sufficient pressure is present so as to allow hydraulic fluid to flow from the non-piston rod side of the cylinder 12' thus retracting the piston rod 19'.

A reservoir R' is fluidly connected to lines L1 and L2 via pilot-to-open check valves 110a' and 110b'. The pilot-to-open check valves 110a' and 110b' open to admit makeup flow from the reservoir R' to an inlet side of the pump depending on whether the pump is activated to extend or retract the piston/rod.

Also shown in FIG. 8B is a control unit 110' adapted to supply control signals to the motor 18' and to receive input signals from pressure sensors 112a' and 112b' associated with supply/return line L1' and L2', respectively. A position feedback device 114' also supplies position feedback to the control unit 110.

Figure 9:
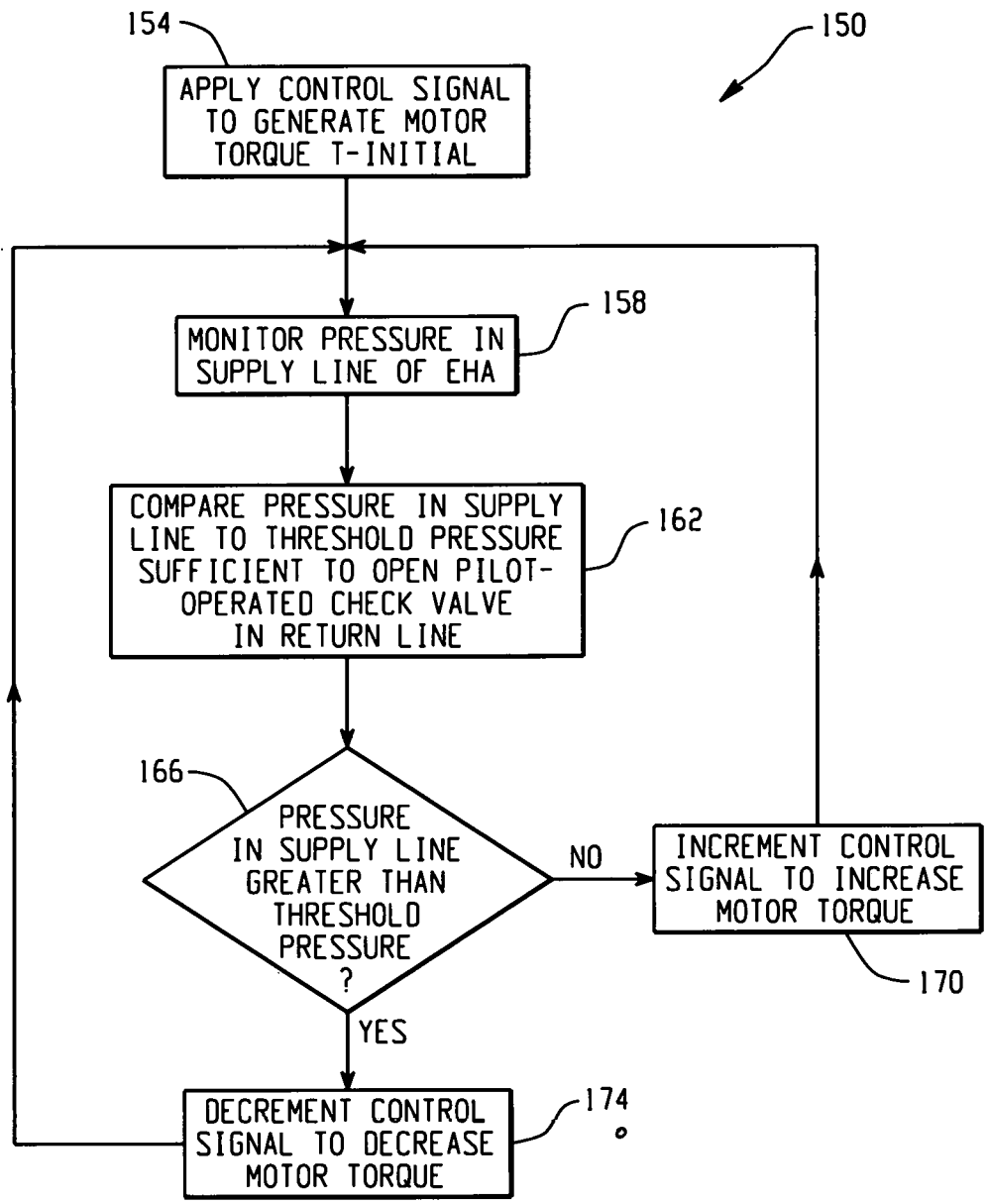
FIG. 9 is a flowchart of a method in accordance with the present disclosure.

With further reference to FIG. 9, an exemplary method for controlling the EHA is illustrated and identified generally by reference numeral 150. The method begins with process step 154 wherein a control signal is applied to the motor 18 to generate an initial torque for driving pump 14 to generate a supply of pressurized hydraulic fluid to the hydraulic cylinder 12. In process step 158, the pressure in the supply line of the EHA is monitored and compared to a threshold pressure value in process step 162. In process step 166, if the monitored pressure in the supply line is less than the threshold value, the method proceeds to process step 170 wherein the motor control signal is incremented to increase the motor torque. The method then reverts to process step 158 whereat the pressure in the supply line is monitored and compared to the threshold valve. This continues until the pressure in the supply line is greater than the threshold value and then the method proceeds to process step 174 whereat the control signal is decremented to decrease motor torque. The method then reverts back to process step 158 where the supply line pressure is monitored and compared again the threshold pressure. It should be appreciated that the control signal is thus rapidly and continually adjusted to generate a pressure in the supply line that closely corresponds to the threshold pressure under most conditions. External factors (e.g., load, etc.) will have an effect on the pressure in the supply line and therefore the continuous and rapid adjustment of motor torque will result in the smooth operation of the EHA despite changes to external factors.

Aspects of the present disclosure are directed to an EHA that includes a high density servo motor using T-LAM technology which reduces the size of the overall package and provides efficient continuous torque throughout the desired speed range.

An integrated servo drive utilizes the aluminum actuator's body to act as a heat sink to remove heat from the drive extending the capability. The servo motor control provides smooth, controlled "on-demand" operation of the pump. It does not slam on and off the pump compared to a conventional brush DC motor being turned on and off abruptly ramping (uncontrolled) to full speed and then suddenly decelerating to zero (this rapid uncontrolled on and off high-speed can degrade the hydraulic oil over time).

The exemplary drive (control unit) in accordance with the present disclosure incorporates a closed loop control system which provides several benefits including the simplification of the valve circuit. Present exemplary embodiments utilize only two valves and do not require a counterbalance valve. Instead, the counterbalance valve operation has been mimicked by providing a closed-loop control that allows the drive to accurately control how much pressure is supplied to the pilot-operated check valve by varying the current supplied to the motor. This allows the smooth, controlled motion of a counterbalance valve while using the less expensive pilot-operated check valves.

As compared to an open-loop system, the drive does not know how much current is needed to open the check valve. In this scenario, the drive provides a set current, and the motor outputs a torque corresponding to that current. Whether or not the torque provided by the motor builds enough pressure to open the valve depends on the load acting on the actuator. The pilot pressure needed to open a pilot-operated check valve is directly related to the load applied to the actuator. The higher the load, the higher the pilot pressure required to open the valve. The drive has no way of knowing if the current is adequate to open the valve, so it provides the set current and awaits further user input.

In the closed-loop system of the present disclosure, the drive provides the necessary current to the motor which turns the pump which moves the piston rod to the desired force or position. The feedback "error" is controlled ultimately via hydraulic fluid pressure/flow opening and closing the appropriate valves. If the provided current is inadequate, the drive provides more current until enough pressure develops to finally open the valve. The counterbalance valve function is imitated when the drive continually adds and removes current to maintain the necessary pressure as the actuator moves to the desired position or at the desired velocity. The closed loop system of the present disclosure can control position, velocity, and other factors, while also providing the additional benefit of mimicking a counterbalance valve while still using the less expensive check valves. The configuration also locks the actuator into position as needed (e.g., when the system is de-energized).

An EHA in accordance with aspects of the present disclosure is designed to be a truly modular product. The modular parts include, but are not limited to the pump, cylinder (and its components), the motor and drive. In one configuration the EHA can have a maximum force of about 9,500 lbf. In another configuration, the EHA can have a maximum force of 37,500 lbf. As noted above, various parts can be easily interchanged creating a multitude of products ranging from, for example, a few hundred pound-force to 169,000 lbf, with various speed ranges. Of course, other configurations are possible outside of the exemplary ranges. In one arrangement, four pumps, four cylinder diameters, two motors and three drives can be configured to produce hundreds of different products for virtually any application. This keeps the inventory low and allows quick assembly, testing and delivery of custom configurations.

With the modularity mentioned above, the system can be provided in several/various configurations, as illustrated in FIGS. 10A-10D.

Figure 10A:
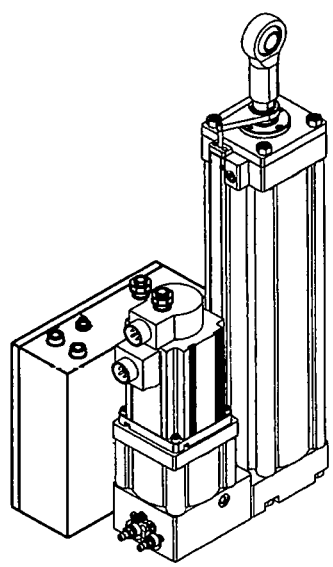
FIG. 10A is a first arrangement of a modular EHA in accordance with the present disclosure.

1) Motor/Pump MP and Drive Box DB attached to cylinder C (FIG. 10A)

Figure 10C:
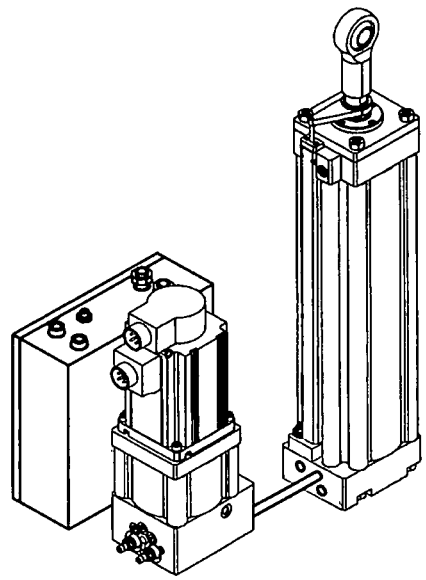
FIG. 10C is a third arrangement of a modular EHA in accordance with the present disclosure.
Figure 10D:
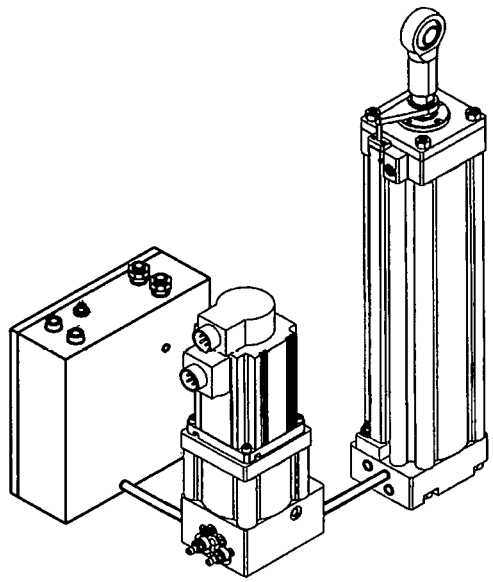
FIG. 10D is a fourth arrangement of a modular EHA in accordance with the present disclosure.
Figure 10B:
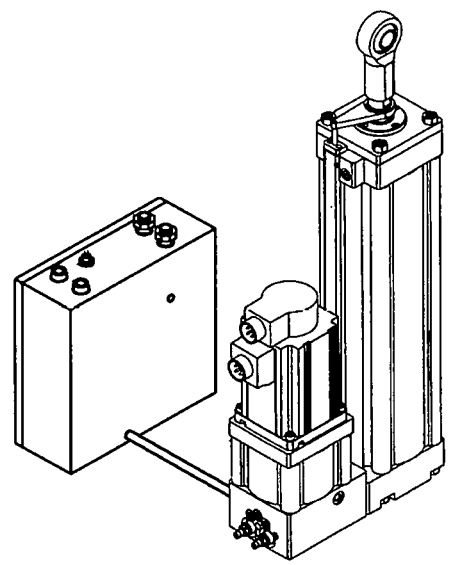
FIG. 10B is second arrangement of a modular EHA in accordance with the present disclosure.

2) Motor/Pump attached to cylinder C and Drive Box DB remotely mounted (FIG. 10B)

3) Motor/Pump MP & Drive Box attached to each other and remotely mounted from cylinder C (FIG. 10C)

4) Motor/Pump MP remotely mounted & Drive Box remotely mounted (FIG. 10D)

As will be appreciated, rotary actuators can also be used in accordance with certain aspects of the present disclosure.

In some applications, various pump sizes are used to provide different speed combinations. The pump can be easily exchanged and is connected to the selected motors and to the manifold.

The cylinders range from, for example, 1 inch to 6 inches in diameter giving a force range from a few hundred pounds to 169,000 lbf. Of course, any size cylinder can be used in accordance with aspects of the present disclosure.

The drive control provides enough power to control the standard servo motors while incorporating numerous field buses including Ethernet, CAN and Modbus RTU.

The standard motor offering is uniquely designed for the EHA with high torque at lower speeds. The system is fully configurable, it can also be adapted to work with the standard size NEMA motors.

The system can also include various standard feedback devices including pressure sensors which provide accurate force control along with position sensors.

The system may also include a position feedback device which is driven from a retractable cord that is spring driven which winds up as the piston retracts and unwinds as the piston extends. The cord is attached to a gear driven device which can be adaptable to an accurate sensing device (e.g., 0.001 inches) which is also adaptable to the various stroke lengths. The cord and reel is in the high pressure, the electronics are isolated to the atmosphere or lower pressure allowing easy wiring and connectivity.

Suitable electric motors can include the following exemplary specifications. It should be appreciated, however, that aspects of the present disclosure are not limited to any particular electric motor.

Electric Motor Group—Example 1 Orbex Group (Two Configurations):

| | 80 mm | |
|---|---|---|
| Model Number - | HPM80-04-120-01 | HPM80-04-200-01 |
| Rated Power W - | 1250 | 1250 |
| Rated Voltage Vac - | 120 | 220 |
| Contin. Stall Torque Nm - | 4.77 | 4.77 |
| Maximum Torque Nm - | 14.31 | 14.31 |

-continued

| | 80 mm | |
|---|---|---|
| Rated Speed RPM - | 2500 | 2500 |
| Max. Speed RPM - | 3000 | 3000 |
| Rated Current A - | 11.25 | 5.8 |
| Max Current A - | 33.75 | 17.4 |
| Back EMF ConstV/kRPM - | 43.8 | 87.7 |
| Torque Constant Nm/A - | 0.42 | 0.82 |
| Winding Resistance Ohms - | 0.65 | 2.4 |
| Winding Inductance mH - | | 9.65 |

Electric Motor Group—Example 2 Orbex Group (Three Configurations)

| | 120 mm | | |
|---|---|---|---|
| Model Number - | HPM120-03-120-01 | HPM120-03-200-01 | HPM120-03-400-01 |
| Rated Power W - | 4000 | 4000 | 4000 |
| Rated Voltage Vac - | 120 | 220 | 440 |
| Contin. Stall Torque Nm - | 12.7 | 12.7 | 12.7 |
| Maximum Torque Nm - | 38.1 | 38.1 | 38.1 |
| Rated Speed RPM - | 3000 | 3000 | 3000 |
| Max. Speed RPM | 5000 | 5000 | 5000 |
| Rated Current A - | 30 | 23.8 | 11.9 |
| Max Current A - | 90 | 71.4 | 35.7 |
| Back EMF ConstV/kRPM - | 42.4 | 51.6 | 103.2 |
| Torque Constant Nm/A - | 0.42 | 0.493 | 0.986 |
| Winding Resistance Ohms- | | 0.4 | 0.4 |
| Winding Inductance mH- | | 0.48 | 4.8 |

Figure 11:
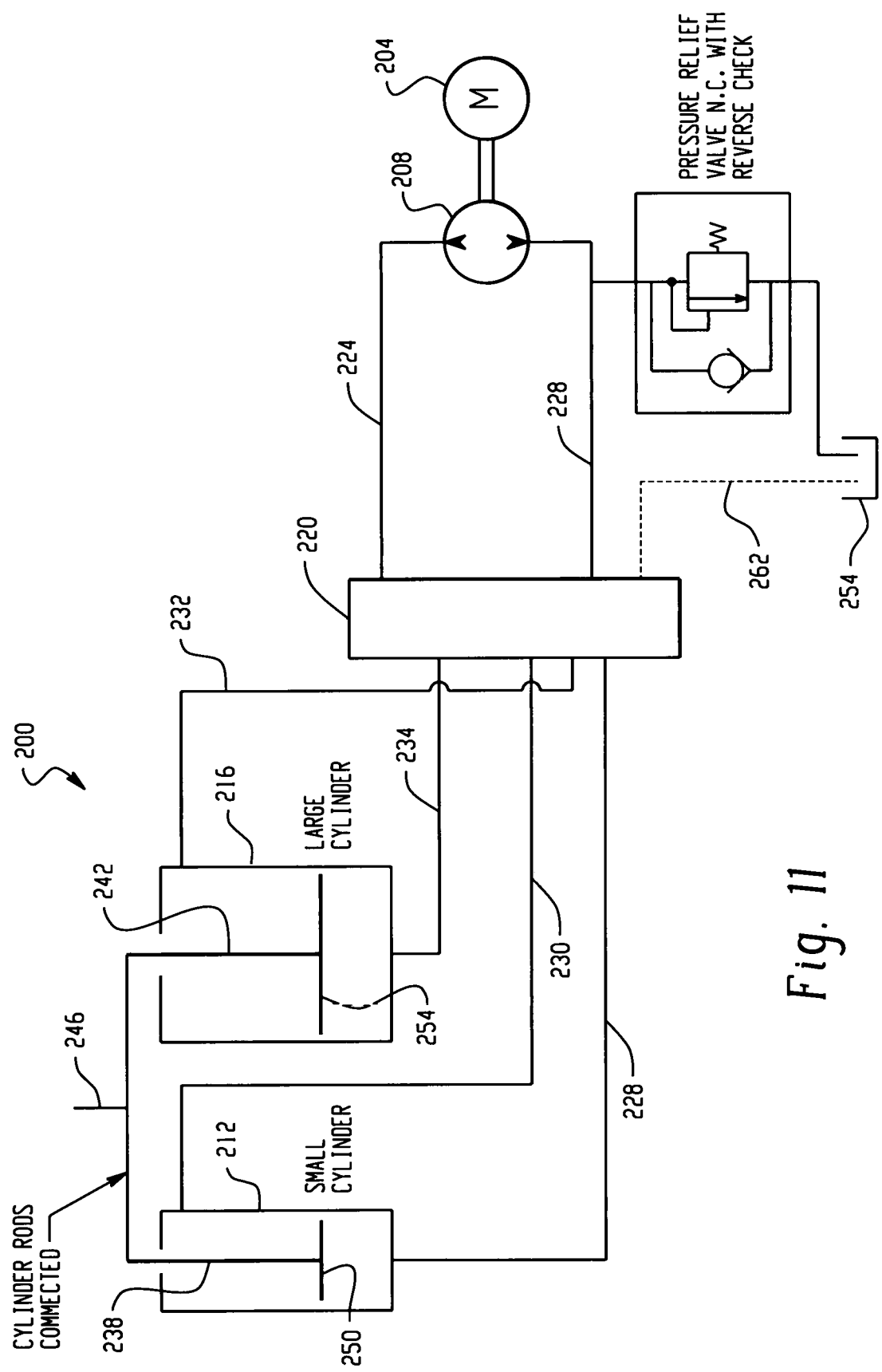
FIG. 11 is a schematic diagram of another hydraulic circuit in accordance with the present disclosure.

With reference to FIG. 11, another exemplary hydraulic system is schematically illustrated and identified generally by reference numeral 200. It should be appreciated that aspects of system 200 can be implemented in various embodiments, such as in conjunction with the above-described EHAs and/or in conjunction with other EHAs. In other words, features of the system 200 can be implemented in a wide variety of EHAs in addition to the EHAs described in the present disclosure.

System 200 generally includes a motor 204 (e.g., a servo motor) operatively coupled to a reversible hydraulic pump 208 for supplying pressurized fluid to a small cylinder 212 and a large cylinder 216. To this end, the pump 208 is connected to a control valve 220 via supply/return lines 224/228. The control valve 220 is adapted to control the flow of pressurized fluid to each of the small cylinder 212 and large cylinder 216 in accordance with one or more methods, which will be described below. As will be appreciated, each of the small cylinder 212 and large cylinder 216 are connected to the control valve 220 via respective supply/return lines 228/230 and 232/234.

Cylinder rods 238 and 242 of the small cylinder 212 and the large cylinder 216, respectively, are each coupled to a common actuator rod 246. As such, either cylinder 212 or 216 can extend or retract the actuator rod 246. For a given flow rate and pressure of hydraulic fluid supplied by the pump 208, the small cylinder 212, having a smaller diameter piston 250, produces faster movement of the actuator rod 246 with lower maximum force, while the large cylinder 216, having a larger diameter piston 254, produces a slower movement of the actuator rod 246 with a greater maximum force.

In operation, the embodiment of FIG. 11 uses a combination of motion control and self-contained hydraulics as a unique approach and a cost-effective solution to possibly eliminate all hydraulics (e.g., central hydraulics) on large presses/machines. The exemplary design uses the small cylinder 212 (e.g. 1 in cylinder) as the speed cylinder which can move up to, for example, 60 in/sec at lower loads (e.g., <2400 lbf). During the fast cycle, the large cylinder 216 is in a float mode (zero pressure) and the fluid is pushed from the large cylinder 216 into a reservoir 254 for future use through large orifices (not shown) and drain line 262 such that the large cylinder 216 effects little drag on the extension/retraction of the actuator rod 246. Likewise, the small cylinder 212 can be placed in float mode during operation of the large cylinder 216.

Aspects of the above-described system 200 can be utilized in various configurations to facilitate quick movement of the actuator rod 246 over a relatively larger distance under relatively light loads (e.g., such as when positioning a press element after placement of a new blank), while providing high force for a relatively smaller distance and relative small period. In one embodiment, the system (e.g., EHA) is configured to move quickly under light load (<2400 lbf) for a distance (e.g. 20 inches), then press a large load (~50,000 lbf) for a small distance (<0.5 in) and a small period.

It should be appreciated that the position feedback arrangement, as described above in connection with FIG. 1 (e.g., the linear potentiometer 60), can be utilized in the system 200 to monitor the position of the actuator rod 246 as it is moved with the small cylinder 212. Once at the desired position, using the control valve 220, the system 200 places the small (fast) cylinder 212 in float mode and applies high pressure (e.g., 3000 PSI (or whatever pressure is needed)) to the large cylinder 216 which applies the required working force for a given application. After the working force application is completed, the system 200 then switches back to the small (fast) cylinder 212 and the cycle continues. Position feedback devices can also be used to monitor the position of one or both cylinder rods for the same purpose. In addition, or in the alternative, pressure feedback can be used to accurately control force and determine when to activate/deactivate the cylinders 212 and 216.

It should be appreciated that the system 200 provides closed loop position and force control as desired. The system 200 can also utilize the pressure sensors to close the force control which provides an accurate amount of force to the press as desired. The position and force control can be programmable, meaning the position or force setpoints can be adjusted by analog input signals or via a fieldbus.

Figure 12:
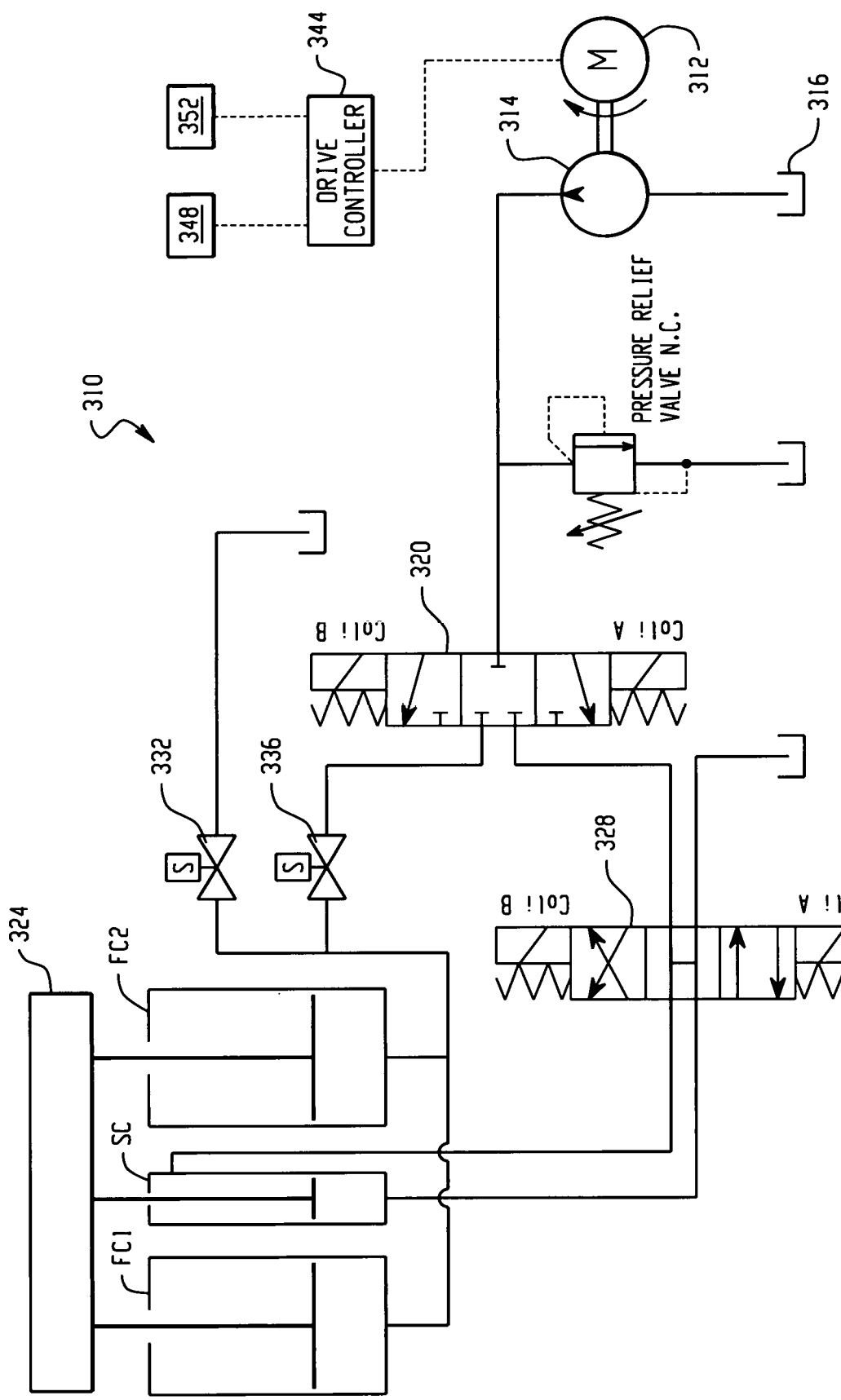
FIG. 12 is a schematic diagram of still another hydraulic circuit in accordance with the present disclosure.

Turning now to FIG. 12, an exemplary hydraulic circuit 310 is illustrated in accordance with the present disclosure. The hydraulic circuit 310 is an open loop circuit and generally includes an electric motor 312 coupled to a pump 314 for supplying pressurized hydraulic fluid. The pump 314 draws hydraulic fluid from a reservoir or sump 316 and supplies pressurized fluid to either force cylinders FC1 and FC2 or speed cylinder SC depending on the position of three-way valve 320. As will be described, the speed cylinder SC and force cylinders FC1 and FC2 are coupled to a platen 324 with the speed cylinder SC used to rapidly extend or retract the platen 324 (or other element), while the force cylinders FC1 and FC2 are used for high force/low speed operations.

During high speed operation, the three-way valve 320 is positioned to supply pressurized fluid to the speed cylinder SC. The speed cylinder SC is a double acting cylinder for both advancing and retracting the platen 324 and, consequently, the force cylinders FC1 and FC2. A reversing valve 328 is provided for directing the pressurized fluid to one or the other side of a piston (not shown) of the speed cylinder SC, depending on whether extension or retraction is desired. Meanwhile, the force cylinders FC1 and FC2 are opened to the sump 316 via valve 332 (valve 336 is closed to prevent backflow to three-way valve 320), to dump or draw hydraulic fluid therefrom depending on whether the speed cylinder SC is extending or retracting.

Once the speed cylinder SC has completed high speed operations, the three-way valve 320 is switched to supply pressurized fluid to the force cylinders FC1 and FC2, while valve 332 is closed and valve 336 is opened.

It should now be appreciated that the circuit 310 is operative to provide high speed positioning of the platen 324 while still providing a required high force output once moved into position. During typical operations, the speed cylinder SC will be used to rapidly advance the platen 324 into position for a force stroke, and then the force cylinders FC1 and FC2 will be activated to carry out the force stroke. After completion of the force stroke, the speed cylinder SC will be activated once again to retract the platen 324, and the cycle can repeat.

In the exemplary embodiment, the motor 312 can be a stepper motor or other suitable motor. The pump 314 can be a gear pump, for example. As noted, the force cylinders FC1 and FC2 are single acting cylinders, but in other configurations could be double acting cylinders.

Controlling the movement of the platen 324 can be done using precise position control, for example. As shown in FIG. 12, a drive controller 344 is coupled to the motor 312. The drive controller 344 is further coupled to one or more of valves 320, 328, 332 and/or 336 for switching the state of the same. One or more pressure sensors 348 provides pressure feedback information to the drive controller 344. The pressure sensors 348 can be positioned at any suitable location within the circuit (e.g., in/adjacent the speed cylinder SC and/or the force cylinders FC1 and FC2 for example). One or more position transducers 352 provide position feedback to the drive controller 344. This includes sensing the position of the platen 324 either directly or indirectly, and controlling the speed cylinder SC and/or force cylinders FC1 and FC2 at least in part based on the position of the platen 324. It should be appreciated that the position feedback arrangement, as described above in connection with FIG. 1 (e.g., the linear potentiometer 60), can be utilized in the system 310 to monitor the position of the platen 324 and/or one or more of the speed cylinder SC and/or force cylinders FC1 and FC2. In one example, the platen 324 is advanced using the speed cylinder SC to a predetermined position, and then the force cylinders FC1 and FC2 are activated to complete a load stroke. Pressure related control can also be used in alternative or in addition to position based control.

Figure 13:
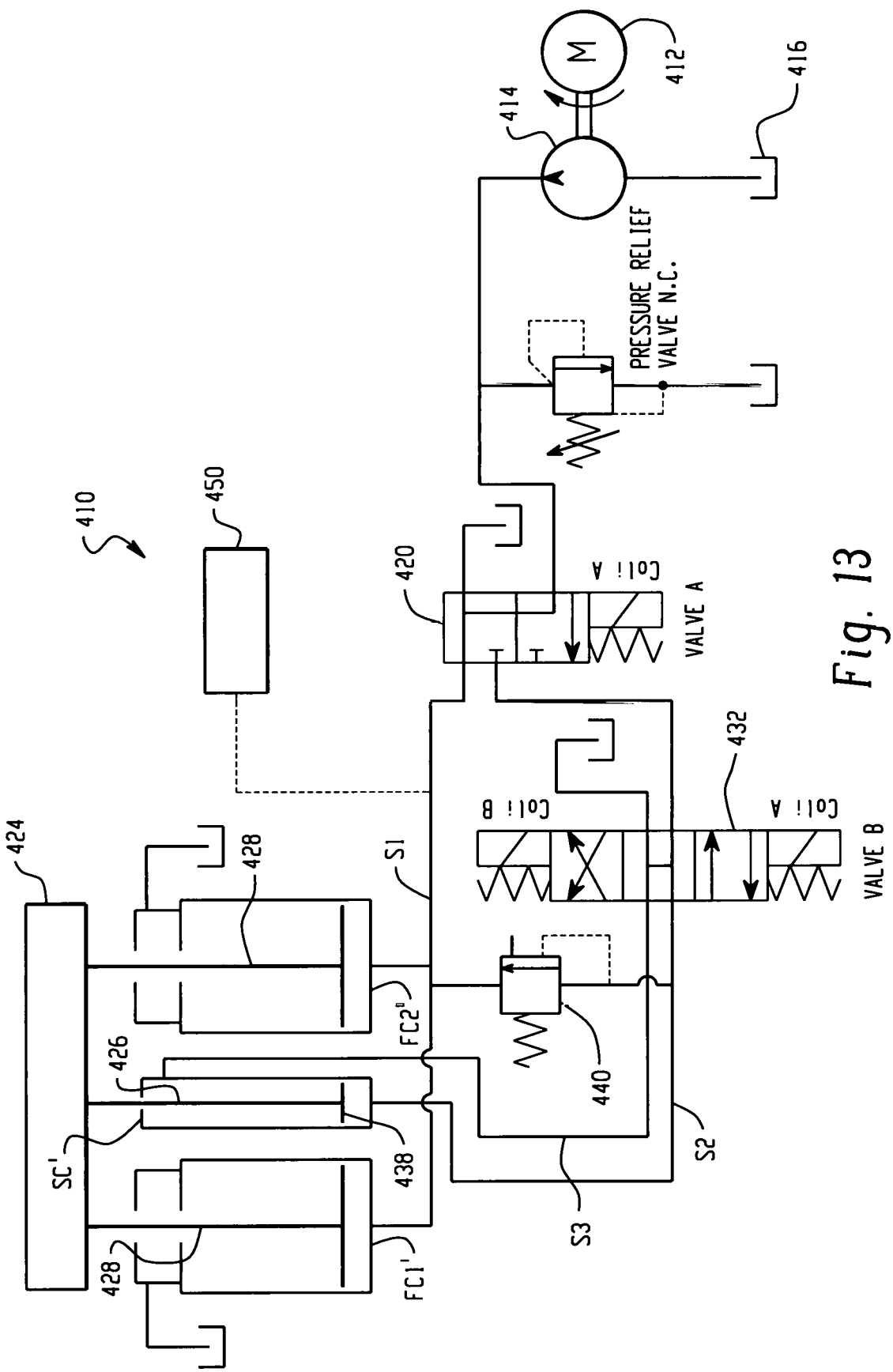
FIG. 13 is a schematic diagram of still yet another hydraulic circuit in accordance with the present disclosure.

With reference to FIG. 13, another exemplary hydraulic circuit 410 is illustrated in accordance with the present disclosure. The hydraulic circuit 410 offers similar functionality to the hydraulic circuit 310 shown and described in connection with FIG. 12 (high speed/high force), but does so through the use of double bore force cylinders FC1' and FC2' that permit fluid to directly bypass the pistons of each cylinder during at least a portion of the stroke of the piston rods of each cylinder. This allows the pistons to move rapidly during at least a portion of their strokes (e.g., a bypass portion of the stroke), while still providing high force functionality during at least a second portion of their strokes (e.g., a power portion of the stroke).

The hydraulic circuit 410 is an open loop circuit and generally includes an electric motor 412 coupled to a pump 414 for supplying pressurized hydraulic fluid. In the illustrated embodiment, the pump 414 is a gear pump, but other types of pumps can be used without departing from the scope of the present disclosure. The pump 414 draws hydraulic fluid from a reservoir or sump 416 and supplies pressurized fluid to either double bore force cylinders FC1' and FC2' or a speed cylinder SC' via supply lines S1 and S2, as further described herein, when a two-way valve 420 is opened. As will be described, the speed cylinder SC' is used to rapidly extend or retract a platen 424 (or other element), while the double bore cylinders FC1' and FC2' are used for high force/low speed operations. Respective drive cylinder rods 426 and 428 of the speed cylinder SC' and double bore force cylinders FC1' and FC2' are coupled to the platen 424 such that the movement of all three cylinders FC1', FC2' and SC' are linked.

During high speed operation, the two way valve 420 is positioned to supply pressurized fluid to the speed cylinder SC' via supply line S1. The speed cylinder SC' in the illustrated embodiment is a double acting cylinder for both advancing and retracting the platen 424 and, consequently, the double bore force cylinders FC1' and FC2'. It should be appreciated that other types of speed cylinder configurations can be provided, including separate advance/retract speed cylinders. A reversing valve 432 is provided for directing the pressurized fluid to one or the other side of a piston 438 of the speed cylinder SC', via supply lines S2 or S3, depending on whether extension or retraction is desired. The speed cylinder SC' is configured to rapidly move the platen 424 when the force cylinders FC1' and FC2' are in the bypass portions of their strokes. This allows rapid repositioning of the platen 424 between high force operations.

In one exemplary embodiment, high force operations are initiated by a sequencing valve 440 that is operative to direct pressurized fluid to the force cylinders FC1' and FC2' when the speed cylinder SC' encounters a restriction (e.g., a load) and the pressure in line S2 rises above a predetermined level. That is, sequencing valve 440 shunt flow to from supply line S2 to supply line S1 when the pressure in supply line S1 rises above a certain level. The arrangement of the sequencing valve 440 provides a purely mechanical solution that provides adequate performance in a many applications.

In the alternative, the circuit 410 can be provided with a controller 450 adapted to receive various inputs from sensors such as pressure sensors, position sensors etc., and configured to output a control signal to a the solenoid valves 420 and/or 432 to control more precisely when flow is shunted between supply lines S2 and S1. For example, sensors (not shown) associated with the force cylinders FC1' and FC2' can sense a position of the respective rods 428 and provide a signal indicative of the same to the controller 450. When the rods 428 are in a position corresponding to the power portion of their stroked, the controller 450 can send a signal to the solenoid valves 420 and/or 432 to shunt flow from supply line S2 to supply line S1. The controller 450 can also receive signals from position sensors associated with other components of the system (e.g., platen 424, speed cylinder SC', etc.) and or pressure feedback from various locations within the system (e.g., within any of the cylinders, supply lines, etc.). The system can also make process decisions based on pressure to reduce cycle times.

Figure 16:
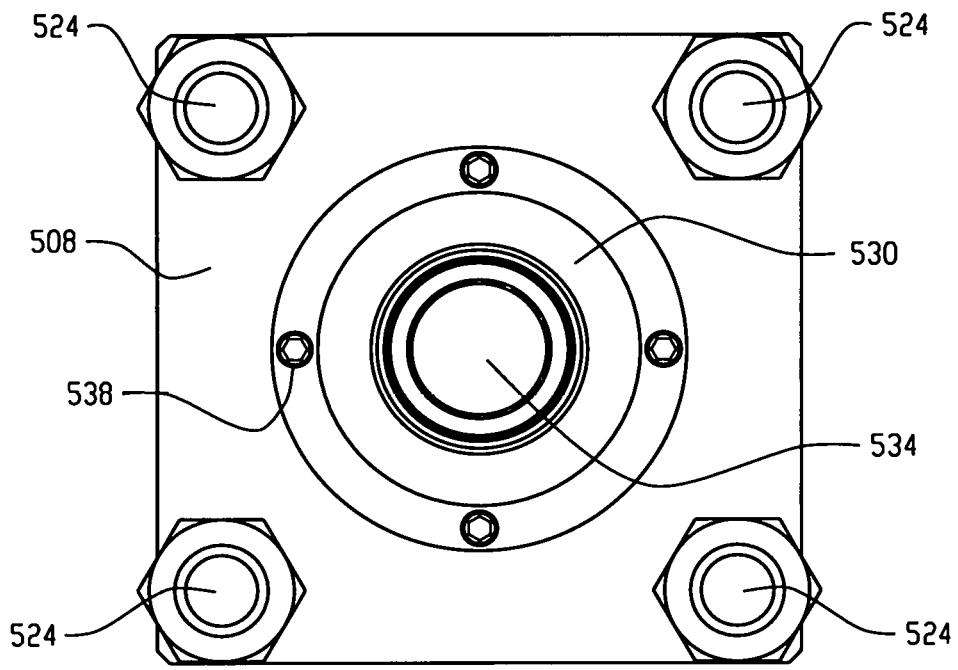
FIG. 16 is a plan view of the double bore cylinder of FIG. 14.

With reference to FIGS. 14-16, an exemplary double bore cylinder (DBC) in accordance with the present disclosure is shown and identified generally by reference numeral 500. The DBC 500 in FIG. 14 is shown in isolation for clarity, but it should be appreciated that the DBC 500 can be utilized in an EHA or other hydraulic system, such as the one described in connection with FIG. 13.

The DBC 500 includes a housing 504 generally defined by an upper end cap 508, a lower end cap 512, and first and second sleeve portions 516 and 520 (lower and upper sleeves, respectively). The end caps 508 and 512 are secured to opposite ends of the sleeves 516 and 520 by, for example, threaded fasteners 524. The threaded fasteners 524 can include bolts or other threaded shafts extending from/ through the assembly with nuts secured thereto, as shown. Other fastening arrangements can be used, and it should be appreciated that at least some of the separate components (e.g., upper end cap 508, lower end cap 512, and the first and second sleeves 516 and 520) can be integrally formed in certain embodiments.

Figure 19:
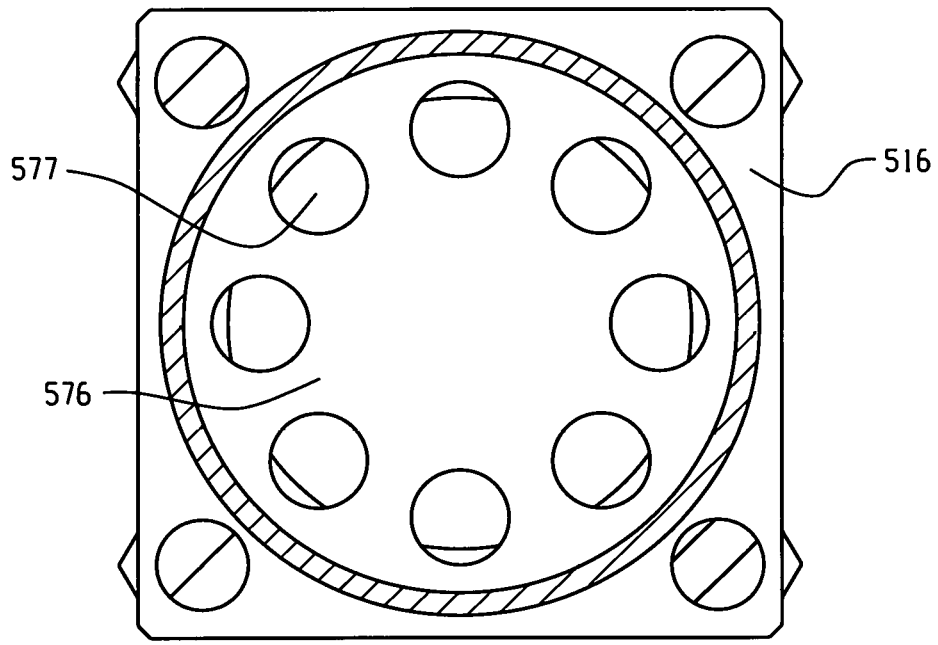
FIG. 19 is a cross-sectional view of the double bore cylinder assembly taken along the line 19-19 in FIG. 17.
Figure 17:
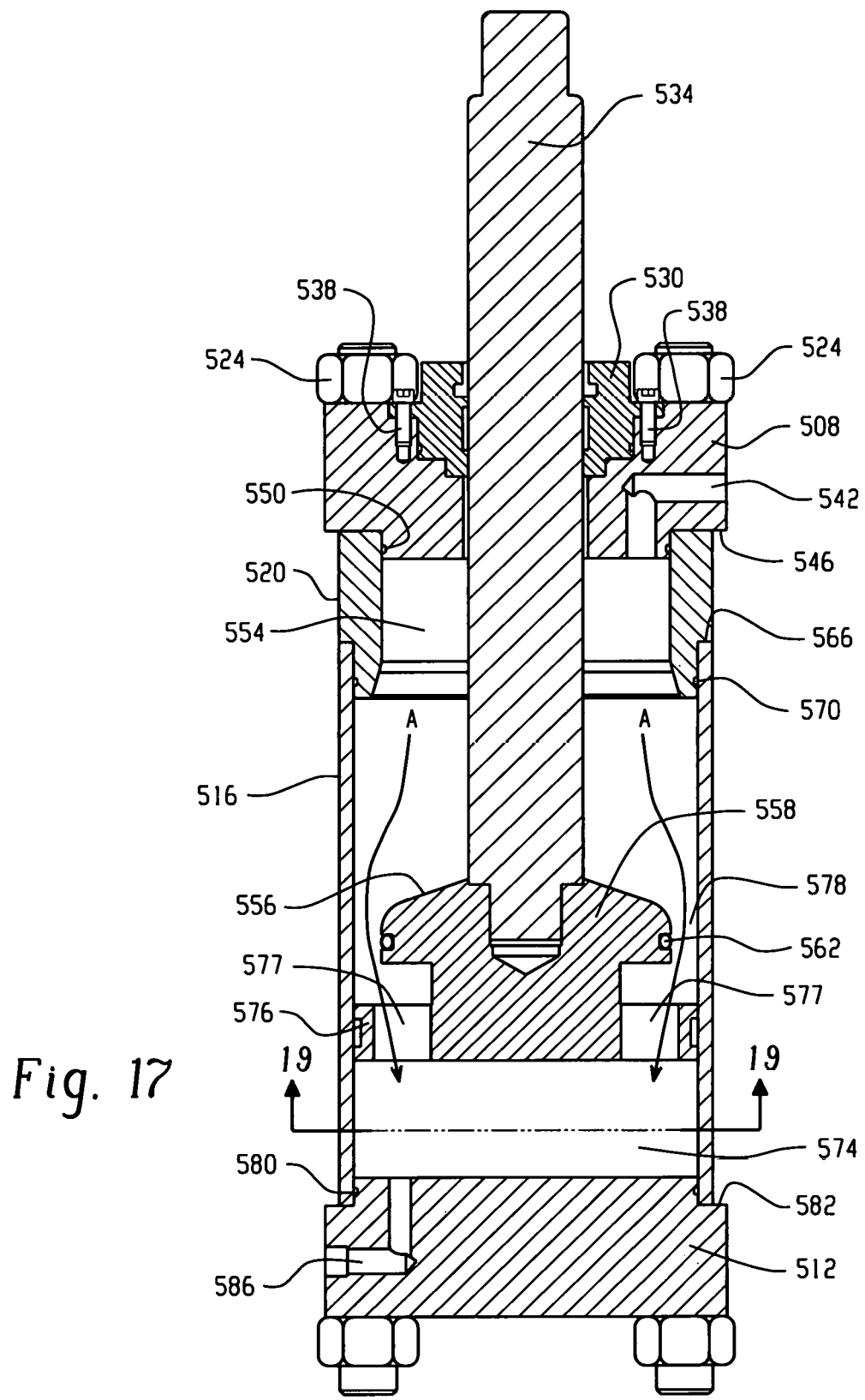
FIG. 17 is a cross-sectional view of the double bore cylinder in its extended position taken along the line 17-17 in FIG. 15.
Figure 18:
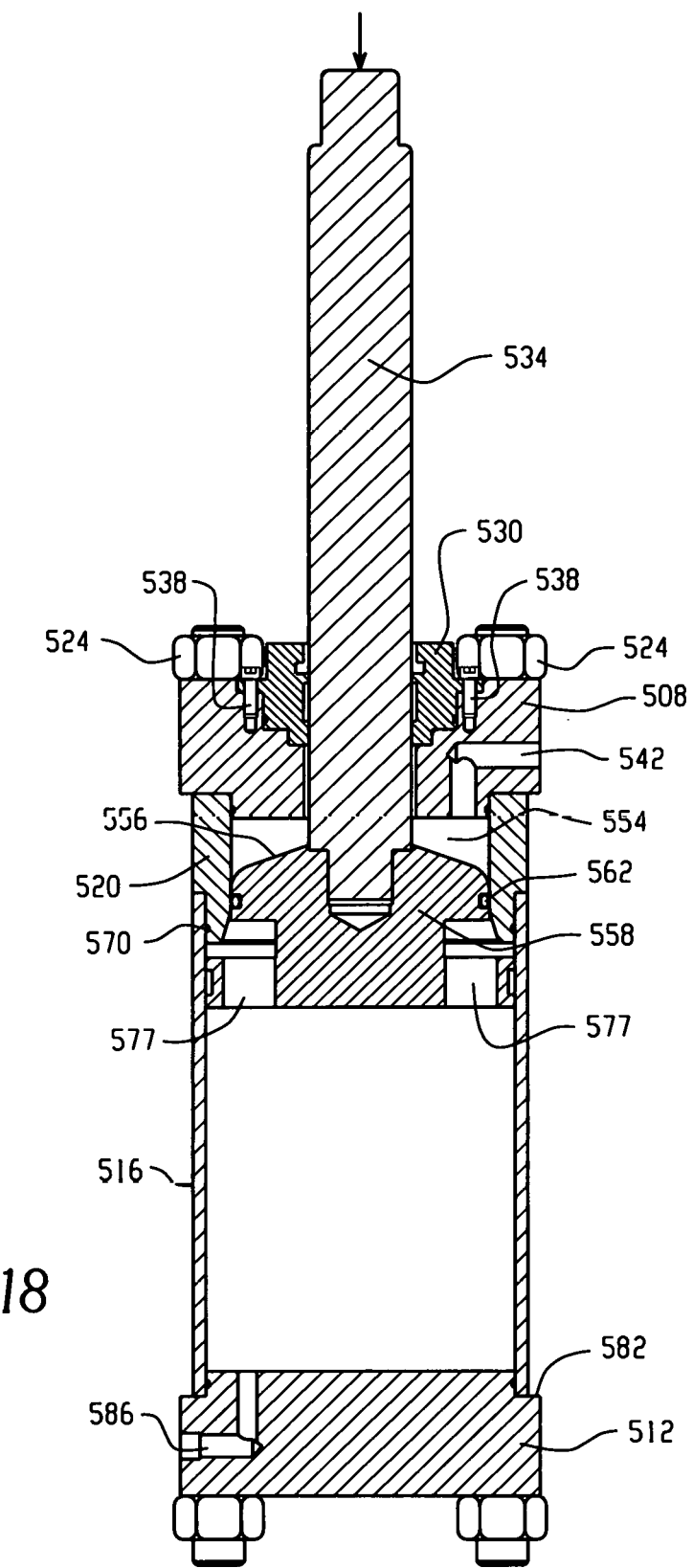
FIG. 18 is a cross-sectional view of the double bore cylinder similar to FIG. 17 but in the retracted position.

With further reference to FIGS. 17-19, the upper end cap 508 includes a seal carrier/bearing carrier 530 for sealing/ supporting a rod 534 for axial movement between a retracted position and an extended position. The seal carrier/bearing carrier 530 is secured to the upper end cap 508 with fasteners 538. A port 542 in the upper end cap 508 is provided for fluidly coupling the interior of the DBC 500 to another component, such as an accumulator or sump, as in the system of FIG. 13, for example. The upper end cap 508 has an annular shoulder 546 for seating against the upper sleeve portion 520. A seal 550, such as an O-ring, forms a seal between the upper end cap 508 and the upper sleeve portion 520 to prevent leakage of fluid from the interior of the cylinder 500.

The upper sleeve portion 520 has a bore 554 forming a portion of the interior of the cylinder 500. As will be appreciated, the diameter of bore 554 is sized to closely receive an upper portion 556 of a piston 558 that is fixed to rod 534, as best shown in FIG. 19. A sealing element 562 supported on the upper portion 556 of the piston 558 is configured to sealingly engage an inner circumference of the bore 554 when the piston 558 is moved within the bore 554. The upper sleeve portion 520 has an annular shoulder 566 for seating against the lower sleeve portion 516, and sealing element 570 (e.g., an O-ring) forms a seal therebetween.

Figure 20:
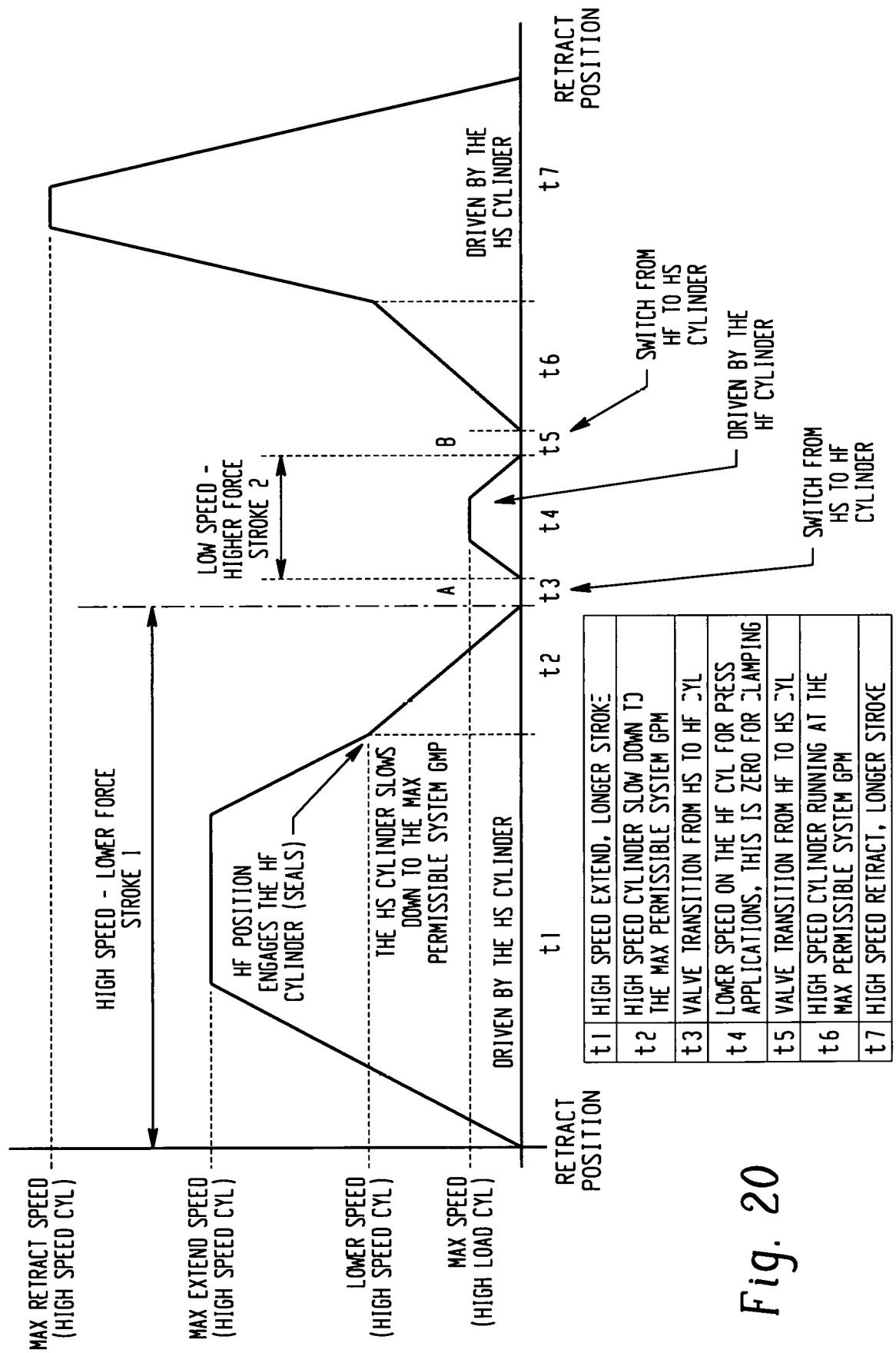
FIG. 20 is a timing diagram for an exemplary system in accordance with the present disclosure.

The lower sleeve portion 516 also has a bore 574 forming a portion of the interior of the cylinder 500. As best shown in FIG. 20, a lower portion 576 of the piston 558 has a diameter adapted to be closely received within the bore 574. The lower portion 576 of the piston 558 has a plurality of passageways 577. As will be appreciated, the diameter of the bore 574 is larger than the diameter of the bore 554 as well as the diameter of the upper portion 556 of the piston 558. This forms an annular gap 578 between the upper portion 556 of the piston 554 and the lower sleeve portion 516 when the upper portion 556 of the piston 558 is within the lower sleeve portion 516. As such, when the piston 558 is moved within the bore 574, fluid is free to flow in the annular gap 578 and via passageways 577 from one side of the piston 554 to the other, as shown by arrows A in FIG. 17. This feature greatly reduces the amount of power required to retract/extend the piston 554 within the bore 574.

It should be appreciated that the upper portion 556 of the piston 558 is spaced axially from the lower portion 576 a distance sufficient to allow the upper portion 556 to fully seat within the bore 554 before the lower portion 576 contacts to the upper sleeve portion 520.

The lower sleeve portion 516 is engaged with an annular shoulder 582 of the lower end cap 512, and a sealing element 580 (e.g., an O-ring) forms a seal therebetween. The lower end cap 512 further includes a port 586 for fluidly coupling the interior of the DBC 500 to another component, such as a source of pressurized fluid (e.g., the pump 414 of FIG. 13).

When the DBC 500 is installed in a system such as the system 410 of FIG. 13, movement of the piston 558 by a mechanically coupled actuator (e.g., speed cylinder SC' in FIG. 13) requires greatly reduced force and allows the rod 534 to quickly be extended/retracted between an upper limit whereat the upper portion 556 of the piston 558 seals within bore 554 to a lower limit whereat the lower portion 576 of the piston 558 abuts the lower end cap 512.

When high force operations are desired, the upper portion 556 of the piston 558 is seated in bore 554 (e.g., via SC' coupled mechanically to the rod 534), and pressurized fluid is supplied to the interior chamber of the DBC 500 via port 586. Upon completion of the high force portion of the stroke, the rod 534 and piston 558 can be quickly retracted as described above.

FIG. 20 shows a generic timing diagram showing the elegance of operation of the design. In this exemplary embodiment, there are two distinct strokes. Stroke 1 is adjustable and is the longer faster stroke driven by the High-Speed Cylinder (e.g., SC') which is mechanically connected to one or more High-Force Cylinders (e.g., FC1' and/or FC2'). Stroke 2 is also adjustable and is usually the shorter slower stroke which can be used for pressing, shearing or clamping, for example. The various times t1 through t7 are shown and can be adjusted to minimize the cycle times.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A modular electrohydraulic actuator comprising an electric motor, a hydraulic pump driven by the electric motor, and a hydraulic actuator in fluid communication with the hydraulic pump, wherein the hydraulic actuator includes a hydraulic cylinder supporting a pressure sleeve in which a piston and rod is adapted for reciprocating motion in response to a supply of pressurized fluid to a first side or a second side of the piston, wherein at least one of the electric motor, hydraulic pump, hydraulic cylinder, piston, piston rod or the pressure sleeve supported in the hydraulic cylinder is selectively removable and replaceable with a different component to vary at least one performance characteristic of the electrohydraulic actuator;
wherein the hydraulic cylinder includes:
a tubular housing in which the pressure sleeve is supported;
first and second end caps enclosing the pressure sleeve in the tubular housing; and
a reservoir extending between the tubular housing and the pressure sleeve; and
wherein at least one of the end caps is removably attached to the tubular housing, and further comprising a rod seal cartridge configured to be interchanged to accommodate different diameter rod sizes.

2. The modular electrohydraulic actuator of claim 1, wherein the pressure sleeve is interchangeable such that a plurality of different diameter pressure sleeves and pistons can be supported within the tubular housing.

3. The modular electrohydraulic actuator of claim 1, further comprising compressible foam at least partially occupying a portion of the reservoir, the compressible foam operative to compress to accommodate hydraulic fluid and to expand to expel hydraulic fluid depending on a pressure of the hydraulic fluid within the reservoir.

4. The modular electrohydraulic actuator of claim 3, wherein the foam includes a closed-cell Epichlorohydrin (ECH) foam.

5. The modular electrohydraulic actuator of claim 1, wherein the pump and the actuator are fluidly connected by first and second lines and further comprising:
a first pilot-operated check valve for restricting or permitting flow through the first line based at least in part on a pressure in the second line;
a second pilot-operated check valve for restricting or permitting flow through the second line based at least in part on a pressure in the first line;
wherein the pump is configured to supply fluid via either the first or second lines to the actuator with a pressure sufficient for the pilot-operated check valve of the other line to permit flow therethrough.

6. The modular electrohydraulic actuator of claim 1, further comprising a drive controller, wherein at least one of the electric motor, hydraulic pump driven by the electric motor, hydraulic actuator or driver controller are separately mountable in spaced relation to the other components.

7. The modular electrohydraulic actuator of claim 1, further comprising a position feedback device for providing position feedback information to a controller.

8. A modular hydraulic cylinder comprising:
a tubular housing;
a pressure sleeve supported within the tubular housing;
a piston and rod at least partially supported in the pressure sleeve for reciprocating motion;
first and second end caps enclosing the pressure sleeve in the tubular housing; and
a hydraulic fluid reservoir extending between the tubular housing and the pressure sleeve;
wherein at least one of the pressure sleeve, piston or piston rod can be removed from the tubular housing and replaced with a respective component having a different size to change an operating characteristic of the hydraulic cylinder;
wherein at least one of the end caps is removably attached to the tubular housing, and further comprising a rod seal cartridge supported by one of the end caps that is configured to be interchanged to accommodate different diameter rod sizes.

9. The modular hydraulic cylinder of claim 8, further comprising at least one threaded fastener for securing the at least one end cap removably attached to the tubular housing.

10. The modular hydraulic cylinder of claim 8, further comprising compressible foam at least partially occupying a portion of the reservoir, the compressible foam operative to compress to accommodate hydraulic fluid in the reservoir and to expand to expel hydraulic fluid from the reservoir depending on a pressure of the hydraulic fluid within the reservoir.

11. The modular hydraulic cylinder of claim 10, wherein the foam includes a closed-cell Epichlorohydrin (ECH) foam.

12. A double bore hydraulic cylinder comprising:
a body including a first bore having a first diameter and a second bore having a second diameter, the first bore and the second bore forming a chamber of the cylinder;
a piston supported for axial movement within the chamber of the cylinder and having a first portion and a second portion, the first portion configured to seal within the first bore during a first part of its stroke, and to permit fluid to bypass the first portion within the chamber during a second part of its stroke, the second portion axially spaced from the first portion and having a diameter adapted to be closely received in the second bore; and a piston rod extending from the piston to an exterior of the body;

whereby fluid bypassing the piston when it is at least partially within the second bore reduces a resistance of the piston to movement within the second bore such that the piston rod can be rapidly extended or retracted by a force applied to the piston rod wherein the first bore has a diameter that is less than a diameter of the second bore, and;

wherein the second portion of the piston has at least one passageway for permitting the flow of fluid therethrough throughout an entire stroke of the piston, the at least one passageway extending in an axial direction through the second portion of the piston and radially offset from a central axis of the second portion of the piston.

13. The double bore cylinder of claim 12, wherein the second portion of the piston is cylindrical, and wherein the at least one passageway extends in parallel to a central axis of the second portion of the piston.

14. The double bore cylinder of claim 13, further comprising a plurality of passageways arranged circumferentially about the central axis of the second portion of the piston.

15. The double bore cylinder of claim 14, wherein when the first portion of the piston is within the second bore, an outer circumferential surface of the first portion of the piston is spaced from the body defining an annular passageway for the flow of fluid from a first axial side of the first portion of the piston to a second axial side of the second portion of the piston via the plurality of passageways in the second portion of the piston.

* * * * *